(12) United States Patent
Kaneyama

(10) Patent No.: US 12,719,386 B2
(45) Date of Patent: Aug. 25, 2026

(54) ELECTRIC-POWER CONVERSION APPARATUS

(71) Applicant: Mitsubishi Electric Corporation, Tokyo (JP)

(72) Inventor: Takashi Kaneyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 168 days.

(21) Appl. No.: 18/816,141

(22) Filed: Aug. 27, 2024

(65) Prior Publication Data

US 2025/0088121 A1 Mar. 13, 2025

(30) Foreign Application Priority Data

Sep. 13, 2023 (JP) ................................ 2023-148155

(51) Int. Cl.
*H02M 7/5387* (2007.01)
*H02H 7/122* (2006.01)
*H02M 7/539* (2006.01)

(52) U.S. Cl.
CPC ............ *H02M 7/539* (2013.01); *H02H 7/122* (2013.01)

(58) Field of Classification Search
CPC ..... H02M 7/5387; H02M 7/539; H02H 7/122
See application file for complete search history.

(56) References Cited

U.S. PATENT DOCUMENTS 9,998,061 B2 * 6/2018 Shinohara ............. H02P 29/024
12,506,403 B2 * 12/2025 Shinohara ............ H02M 1/327
12,512,746 B2 * 12/2025 Bui ......................... H02M 1/08
2011/0007536 A1 1/2011 Takamatsu et al.
2019/0097561 A1 * 3/2019 Sato ...................... H02M 7/797

FOREIGN PATENT DOCUMENTS

JP 4333802 B1 9/2009

* cited by examiner

*Primary Examiner* — Adolf D Berhane
(74) *Attorney, Agent, or Firm* — Sughrue Mion, PLLC

(57) ABSTRACT

An electric-power conversion apparatus is configured to include: an electric-power conversion circuit in which a positive-side switching element and a negative-side switching element are connected in series and from which an AC output is taken out; a DC voltage detector; a phase current detector; and a control device having a control unit that outputs a control signal and a speed instruction signal, an overvoltage protection unit, an overcurrent protection unit, and a gate driving unit that drives the switching elements on the basis of the control signal and the speed instruction signal and that stops driving the switching elements on the basis of the overvoltage interruption signal and the overcurrent interruption signal, wherein, when the speed instruction signal is changed, at least one of the overvoltage determination threshold value and the overcurrent determination threshold value can be changed simultaneously.

16 Claims, 12 Drawing Sheets

CONTROL DEVICE
100
CPU
90
ROM
91
RAM
91
INPUT CIRCUIT
92
OUTPUT CIRCUIT
93
11–16
22–24
21
4

FIG. 7

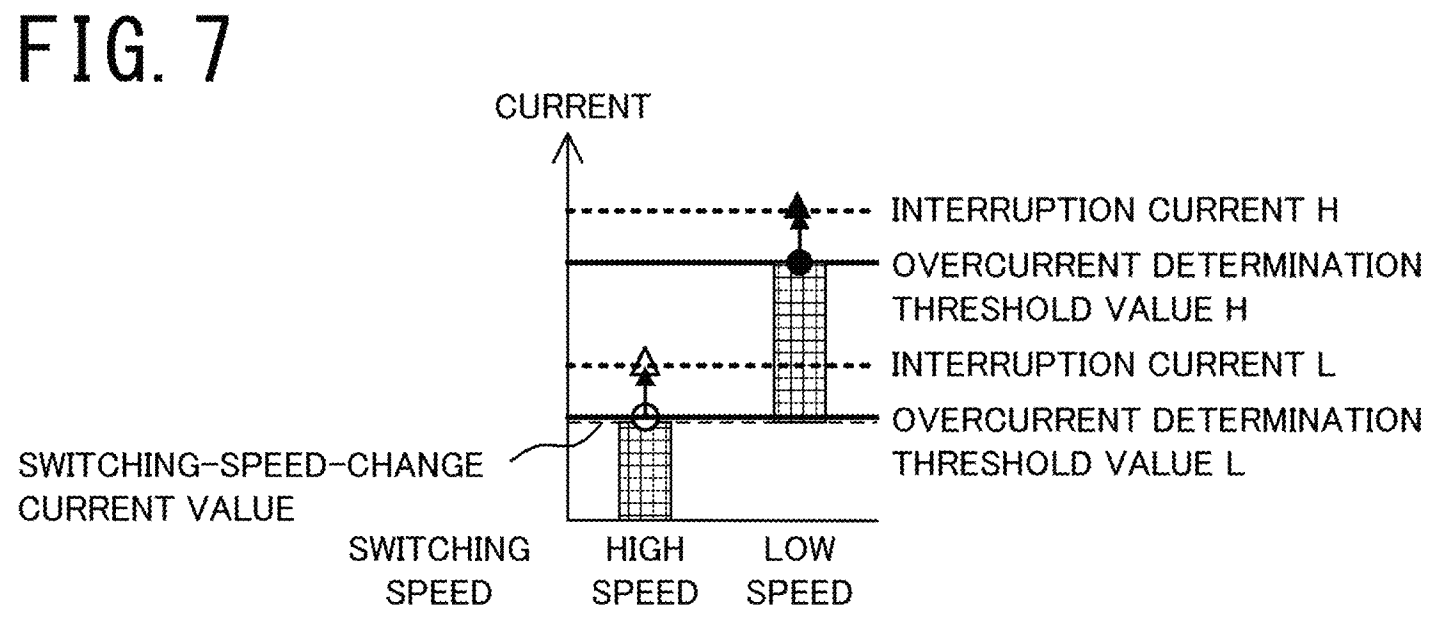

CURRENT

INTERRUPTION CURRENT H

OVERCURRENT DETERMINATION THRESHOLD VALUE H

INTERRUPTION CURRENT L

OVERCURRENT DETERMINATION THRESHOLD VALUE L

SWITCHING-SPEED-CHANGE CURRENT VALUE

SWITCHING SPEED

HIGH SPEED

LOW SPEED

100
CONTROL DEVICE
92
INPUT CIRCUIT
90
CPU
91
ROM
91
RAM
19
OVERVOLTAGE PROTECTION UNIT
20
OVERCURRENT PROTECTION UNIT
93,18
OUTPUT CIRCUIT
11–16
22–24
21
4

ELECTRIC ROTATING MACHINE
ROTATION ANGLE SENSOR
θ
ELECTRIC-POWER CONVERSION APPARATUS
ELECTRIC-POWER CONVERSION CIRCUIT
Vdc
iu
iv
iw
GATE DRIVE UNIT
OVERCURRENT PROTECTION UNIT
OVERVOLTAGE PROTECTION UNIT
CONTROL UNIT
CONTROL DEVICE
COMMAND VALUE
1
2
3
4
10
11
12
13
14
15
16
17
17a
17b
17c
17d
18
19
19a
20
20a
21
22
23
24
100
111
121
131
141
151
161
200

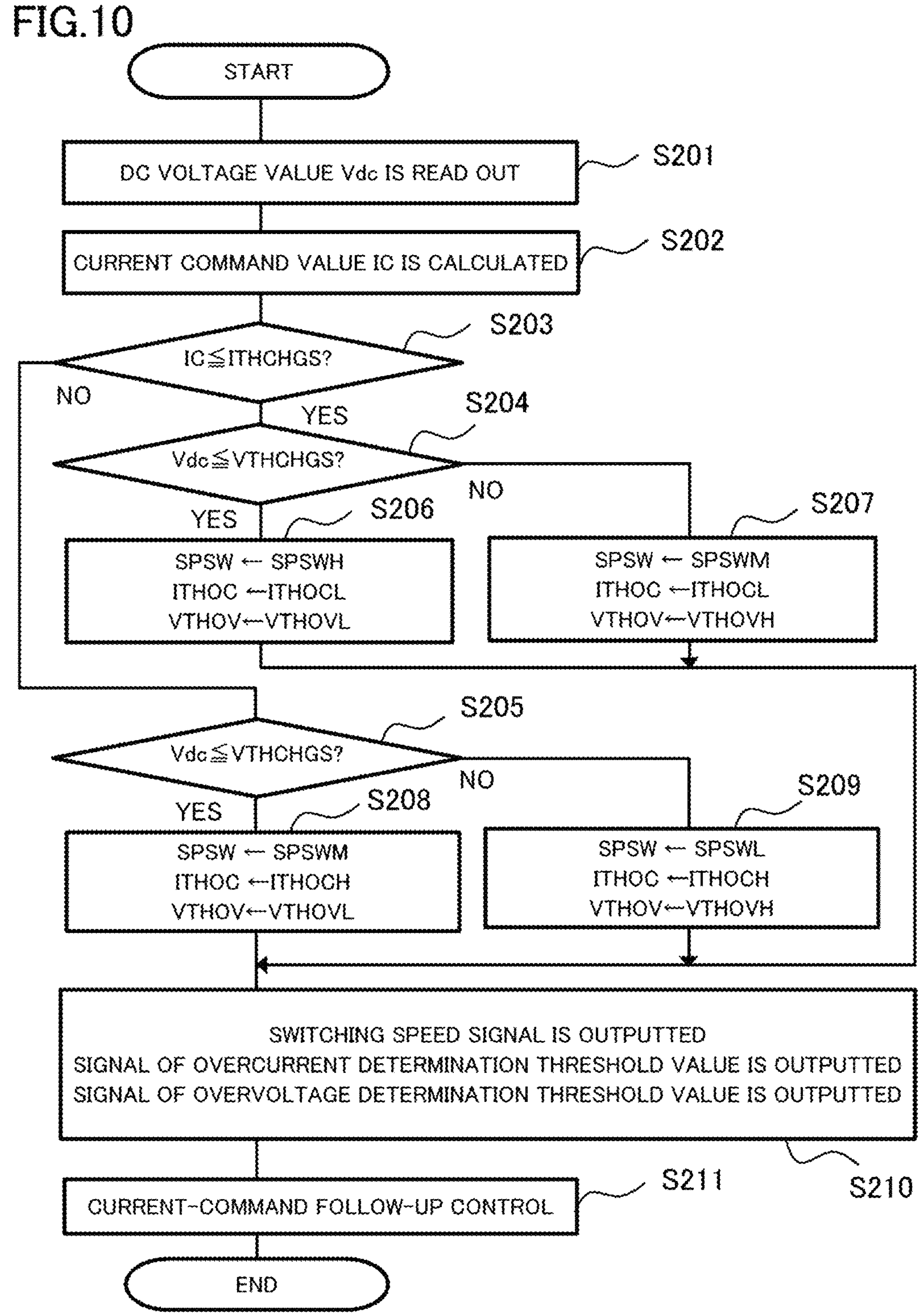
FIG.10
START
DC VOLTAGE VALUE Vdc IS READ OUT
S201
CURRENT COMMAND VALUE IC IS CALCULATED
S202
IC≦ITHCHGS?
S203
NO
YES
Vdc≦VTHCHGS?
S204
NO
YES
S206
SPSW ← SPSWH
ITHOC ←ITHOCL
VTHOV←VTHOVL
S207
SPSW ← SPSWM
ITHOC ←ITHOCL
VTHOV←VTHOVH
Vdc≦VTHCHGS?
S205
NO
YES
S208
SPSW ← SPSWM
ITHOC ←ITHOCH
VTHOV←VTHOVL
S209
SPSW ← SPSWL
ITHOC ←ITHOCH
VTHOV←VTHOVH
SWITCHING SPEED SIGNAL IS OUTPUTTED
SIGNAL OF OVERCURRENT DETERMINATION THRESHOLD VALUE IS OUTPUTTED
SIGNAL OF OVERVOLTAGE DETERMINATION THRESHOLD VALUE IS OUTPUTTED
S210
CURRENT-COMMAND FOLLOW-UP CONTROL
S211
END

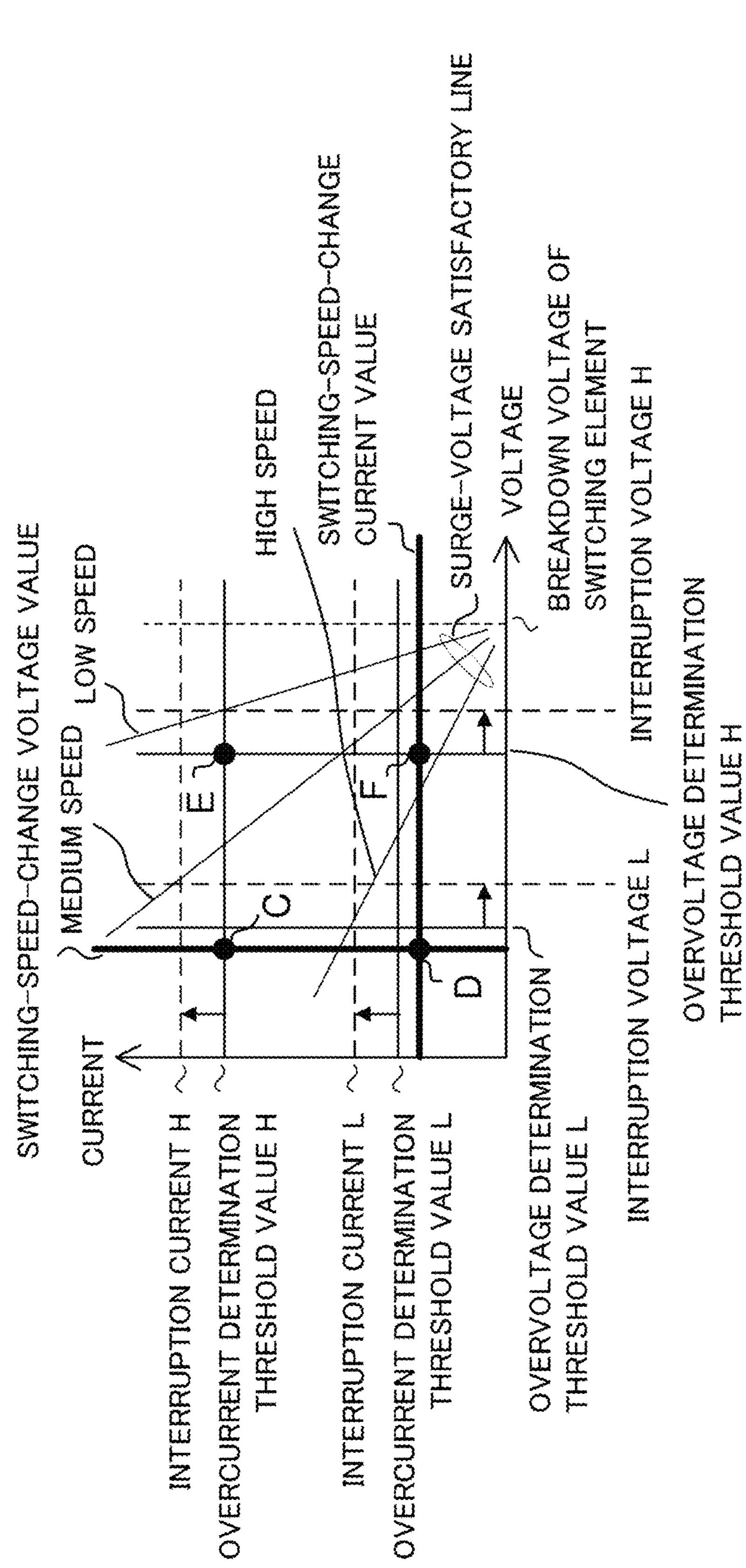
FIG. 11
SWITCHING-SPEED-CHANGE VOLTAGE VALUE
CURRENT
MEDIUM SPEED
LOW SPEED
HIGH SPEED
SWITCHING-SPEED-CHANGE CURRENT VALUE
SURGE-VOLTAGE SATISFACTORY LINE
VOLTAGE
BREAKDOWN VOLTAGE OF SWITCHING ELEMENT
INTERRUPTION VOLTAGE H
INTERRUPTION VOLTAGE L
OVERVOLTAGE DETERMINATION THRESHOLD VALUE H
OVERVOLTAGE DETERMINATION THRESHOLD VALUE L
INTERRUPTION CURRENT H
OVERCURRENT DETERMINATION THRESHOLD VALUE H
INTERRUPTION CURRENT L
OVERCURRENT DETERMINATION THRESHOLD VALUE L
C
D
E
F SWITCHING-SPEED-CHANGE VOLTAGE VALUE
LOW SPEED
SWITCHING-SPEED-CHANGE CURRENT VALUE
VOLTAGE
MEDIUM SPEED
OVERVOLTAGE DETERMINATION THRESHOLD VALUE H
OVERVOLTAGE DETERMINATION THRESHOLD VALUE L
CURRENT
OVERCURRENT DETERMINATION THRESHOLD VALUE H
MEDIUM SPEED
OVERCURRENT DETERMINATION THRESHOLD VALUE L
HIGH SPEED

ELECTRIC-POWER CONVERSION APPARATUS

TECHNICAL FIELD

The present disclosure relates to an electric-power conversion apparatus.

BACKGROUND

Electric-power conversion apparatuses are frequently used as control apparatuses for electric rotating machines (motors) employed in electric vehicles, such as hybrid electric vehicles and battery electric vehicles. As electric-power conversion apparatuses, there are an AC-DC converter (Alternate Current-Direct Current Converter) for converting AC power to DC power, an inverter for converting DC power to AC power, a DC-DC converter (Direct Current-Direct Current Converter) for making a change between levels of DC-power input and output voltages, etc. In many cases, these electric-power conversion apparatuses are each configured with semiconductor switching elements.

An inverter as an example of the electric-power conversion apparatus, that is mounted on the electric vehicle, is used for controlling an electric rotating machine in such a manner as to convert DC power outputted from a DC power source to desired AC power and then to supply that AC power to the electric rotating machine. The electric-power conversion apparatus is configured with: a switching circuit composed by the combination of switching elements; a control circuit that controls the switching elements; a current sensor for detecting a current flowing toward a load such as the electric rotating machine; a capacitor that functions as a measure against switching noises; etc. As an electric-power conversion apparatus in the case of controlling, for example, a three-phase synchronous electric rotating machine, there is such an apparatus in which a switching circuit is provided in each of upper arms (positive-side arms) and lower arms (negative-side arms) for the respective three phases (U-phase, V-phase, W-phase).

The switching elements provided for each of the phases of the inverter are sequentially turned on and off, so that AC power with phases that are different by 120 degrees from each other is supplied to the respective phases of the electric rotating machine to thereby drive that rotating machine. Since the efficiency of such an on-vehicle electric component is directly linked to fuel consumption and electric-power consumption of the vehicle, it is important to reduce its loss.

In order to reduce switching loss of the electric-power conversion apparatus, it is effective to increase the switching speed. However, if the switching speed is increased, a surge voltage at the time of energization or de-energization of the switching element increases, and further its driving noise increases. Thus, increasing the switching speed should be executed to the extent that the switching element can be prevented from being deteriorated and getting beyond its breakdown voltage because of the surge voltage.

Such a technique is disclosed in which an expected surge voltage is calculated on the basis of the temperature of the switching element, the current command therefor and the voltage of the DC power source and, if the surge voltage has a margin relative to the breakdown voltage of the switching element, the switching speed is increased. In order to increase the switching speed, there is proposed a method in which the gate voltage of, for example, an IGBT (Insulated Gate Bipolar Transistor) used as the switching element is elevated, to thereby reduce the switching loss while keeping the surge voltage of the switching element lower than the breakdown voltage (for example, Patent Document 1).

CITATION LIST

Patent Document

Patent Document 1: Japanese Patent No. 4333802

According to the technique of Patent Document 1, a gate voltage matched with an adequate switching speed is determined from the surge voltage calculated on the basis of the command current and the battery voltage. However, this document does not mention on how to set an overcurrent/overvoltage determination threshold value when the switching speed is changed. Accordingly, there is no consideration on how the current or voltage changes after the detection of overcurrent or overvoltage. Thus, when abrupt increase occurs in current or voltage at the time of abnormality, the switching operation may possibly be performed at a current or voltage that is greater than expected. Further, there is concern that the surge voltage may exceed the breakdown voltage value of the switching element to thereby cause a failure of the switching element, a performance degradation thereof, or a shortened life thereof.

In a state in which the electric-power conversion apparatus is operated at an increased switching speed, it is necessary to take into account a large surge voltage that may occur at the time of stopping turning on/off the switching element when the current or voltage abruptly changes to exceed an overcurrent determination threshold value or an overvoltage determination threshold value. Thus, the overcurrent determination threshold value or the over-voltage determination threshold value has to be set to a small value. This also limits the maximum operating current or maximum operating voltage in the case where the switching speed is not increased, so that the operating range of the electric-power conversion apparatus is limited.

SUMMARY

The present disclosure discloses a technique for solving the problem as described above. An object thereof is to provide an electric-power conversion apparatus capable of changing the switching speed in response to an operational state of the electric-power conversion apparatus, which can prevent a failure, a performance degradation or a shortened life of the switching element while ensuring both efficient power conversion operation and wide-range power conversion operation.

Solution to Problem

An electric-power conversion apparatus according to this disclosure comprises:

- an electric-power conversion circuit which is provided with a positive-side switching element connected to a positive electrode of a DC power source, a negative-side switching element connected to a negative electrode of the DC power source, and an external connection point at which the positive-side switching element and the negative-side switching element are connected in series to each other and from which an AC output is taken out;
- a voltage detector that detects a voltage between a positive side and a negative side of the electric-power conversion circuit;

a phase current detector that detects a phase current flowing between the external connection point of the electric-power conversion circuit and an output destination of the AC output; and a control device having: a control unit that outputs a control signal to control the above switching elements, on a basis of an external command value, and that outputs a speed instruction signal to specify a switching speed of the switching elements; an overvoltage protection unit that outputs an overvoltage interruption signal when the voltage detected by the voltage detector is larger than a predetermined overvoltage determination threshold value; an overcurrent protection unit that outputs an overcurrent interruption signal when the phase current detected by the phase current detector is larger than a predetermined overcurrent determination threshold value; and a gate drive unit that turns on/off the switching elements on a basis of the control signal outputted by the control unit, that changes a turn on/off speed of the switching elements on a basis of the speed instruction signal, and that stops turning on/off the switching elements on a basis of the overvoltage interruption signal outputted by the overvoltage protection unit and/or the overcurrent interruption signal outputted by the overcurrent protection unit;

wherein, when the control device changes the speed instruction signal, it simultaneously changes at least one of the overvoltage determination threshold value and the overcurrent determination threshold value.

Advantageous Effects

According to this disclosure, it is possible to provide an electric-power conversion apparatus which can change at least one of the overcurrent determination threshold value and the overvoltage determination threshold value simultaneously with changing the switching speed in response to an operational state of the electric-power conversion apparatus, to thereby prevent a failure, a performance degradation or a shortened life of the switching element while ensuring both efficient power conversion operation and wide-range power conversion operation.

BRIEF DESCRIPTION OF DRAWINGS

FIG. 7 is a graph for illustrating how the electric-power conversion apparatus according to Embodiment 1 will take action at the time of overcurrent detection.

FIG. 10 is a flowchart showing processing of changing a switching speed by a control device of the electric-power conversion apparatus according to Embodiment 2.

FIG. 11 is a graph for illustrating how to set an overcurrent determination threshold value and an overvoltage determination threshold value in the electric-power conversion apparatus according to Embodiment 2.

DESCRIPTION OF EMBODIMENTS

Hereinafter, embodiments of electric-power conversion apparatuses according to this disclosure will be described with reference to the drawings.

1. Embodiment 1

<Configuration of Electric-Power Conversion Apparatus>

Figure 1:
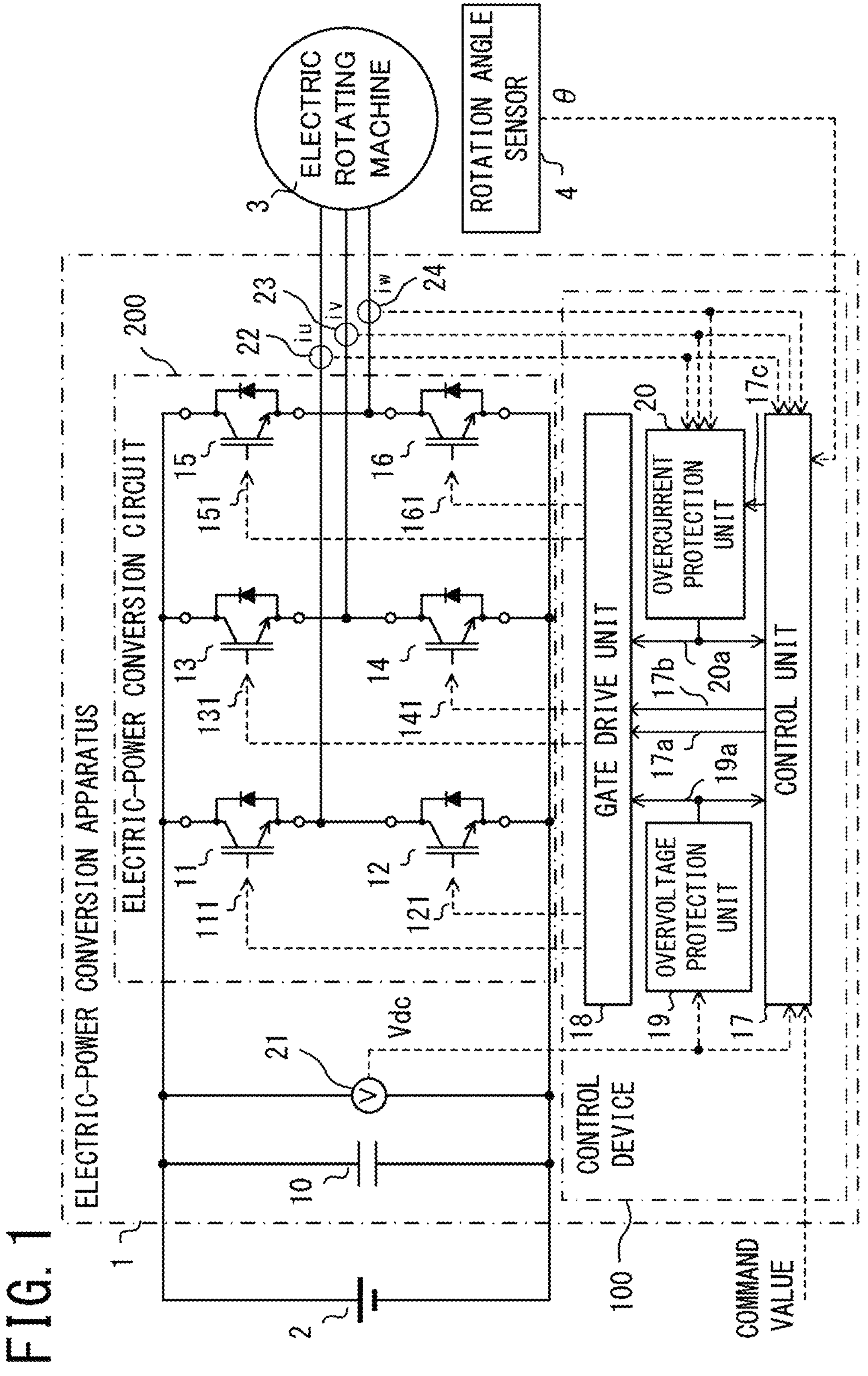
FIG. 1 is a configuration diagram of an electric-power conversion apparatus according to Embodiment 1.

FIG. 1 is a configuration diagram of an electric-power conversion apparatus 1 according to Embodiment 1. The electric-power conversion apparatus 1 may be used in an electric vehicle, such as a battery electric vehicle, a plug-in hybrid automobile, or the like. It may be assumed to be an electric-power conversion apparatus that uses a DC power source such as a battery or the like as an electric-power source, and that is used for driving an electric rotating machine (motor) as a load by using an alternating current. The load is not limited to an electric rotating machine and may be other than the electric rotating machine.

The electric-power conversion apparatus 1 is connected to a DC power source 2 and to an electric rotating machine 3, and is configured with: a smoothing capacitor 10; an electric-power conversion circuit 200 having positive-side switching elements 11, 13, 15 and negative-side switching elements 12, 14, 16; and a control device 100 that controls the switching elements 11 to 16. The DC power source 2 supplies electric power to the electric-power conversion circuit 200 through a positive-side DC bus-bar and a negative-side DC bus-bar. The smoothing capacitor 10 serves to smooth a fluctuation in DC power that may occur by the electric-power conversion circuit 200.

In FIG. 1, the electric-power conversion circuit 200 has: the positive-side switching elements 11, 13, 15 for three phases; the negative-side switching elements 12, 14, 16 for three phases; and three external connection points at each of which the positive-side switching element and the negative-side switching element for each phase are connected in series to each other, and which are connected to the electric rotating machine 3. Each of the switching elements may be composed of a plurality of transistors connected in parallel to each other. Note that, in FIG. 1, a case is illustrated where the electric-power conversion apparatus 1 is provided with outputs of three phases; however, the apparatus may be provided with outputs of two phases or four or more phases.

A rotation angle sensor 4 using a resolver, a Hall element or the like is provided in the electric rotating machine 3, so that a rotation angle $\theta$ of the electric rotating machine 3 is transferred to a control unit 17. In the electric-power conversion apparatus 1, a voltage detector 21 is provided that detects a DC voltage between the positive-side DC bus-bar and the negative-side DC bus-bar, so that a DC voltage value Vdc is transferred to the control unit 17 and an overvoltage protection unit 19. Further, in the electric-power conversion apparatus 1, phase current detectors 22, 23, 24 are provided that detect phase currents flowing from the external connection points of the electric-power conversion circuit 200 to the respective phases of the electric rotating machine 3, so that phase current values iu, iv, iw are transferred to the control unit 17 and an overcurrent protection unit 20.

Further, from the outside of the electric-power conversion apparatus 1, a command value is transferred to the control unit 17, so that the control unit 17 outputs a signal for controlling the switching elements 11 to 16 on the basis of the command value. In order to control the switching elements 11 to 16 by the control unit 17, detection values of the rotation angle sensor 4, the voltage detector 21, the phase current detectors 22, 23, 24 and/or the like may be utilized. As the command value inputted from the outside, a target number of rotations, a target torque, a target current, a target voltage or the like may be assumed. The control unit 17 may be an arithmetic device that executes software to make calculation on input data, to thereby determine an output value.

<Switching Element>

As the switching element, a diode that allows a current to flow only in one direction, a thyristor that is suited for handling a large current, or a power transistor as a power semiconductor switching element that is operable at a high switching frequency, is used in many cases. In particular, out of the semiconductor switching elements, the power transistors are used in a wide variety of fields including automobiles, refrigerators, air conditioners, etc. In the power transistors, there are IGBTs (Insulated Gate Bipolar Transistors) and MOS-FETs (Metal-Oxide-Semiconductor Field-Effect-Transistors), so that different types of these power transistors are used in accordance with various usages.

As a material of the semiconductor switching element, a semiconductor using silicon (Si) is frequently used. However, recently, attention is focused on silicon carbide (SiC) and gallium nitride (GaN). As compared with a conventional semiconductor switching element using silicon, the semiconductor switching element formed of such a wide bandgap semiconductor material has a lower on-state resistance value and thus can reduce power loss. Further, it has a high electron-saturation speed and thus can quickly perform switching between on and off states.

In FIG. 1, a case is shown where IGBTs are used as the switching elements 11 to 16. To each of the IGBTs as the switching elements 11 to 16, a free wheel diode (FWD) is connected in parallel whose forward direction is a direction from the negative side of the DC power source 2 toward the positive side thereof, namely, a direction from the lower side toward the upper side.

Control terminals of the respective switching elements are connected to a gate drive unit 18 of the control device 100. Upon receiving a control signal (on/off signal) 17*a* from the control unit 17, the gate drive unit 18 transfers drive signals 111, 121, 131, 141, 151, 161 to the control terminals of the respective switching elements 11 to 16. Upon receiving a switching speed signal 17*b* from the control unit 17, the gate drive unit 18 changes the switching speed of the switching elements.

<Change of Switching Speed>

The switching speed of the switching element, when it is an IGBT, can be changed in such a manner that the value of its gate resistance is changed to thereby adjust the value of a current flowing into the gate. Increasing the amount of the current flowing into the gate causes the switching speed to increase.

Note that, with respect to the IGBT, it is also possible to change the switching speed by adjusting the voltage of the gate drive circuit to thereby change the gate voltage. When the gate voltage is increased, the switching speed increases and thus the switching efficiency is improved; however, the surge voltage and the switching noise become larger. In contrast, when the gate voltage is decreased, the switching speed decreases and thus the switching efficiency decreases; however, the surge voltage and the noise can be reduced together.

With respect also to a MOS-FET, there is a characteristic in which its rise time becomes longer as the gate current decreases. Thus, it is possible to adjust the switching speed by changing the value of the gate resistance to thereby adjust the gate current.

<Overcurrent Protection, Overvoltage Protection>

When the DC voltage value Vdc exceeds an overvoltage determination threshold value VTHOV, the overvoltage protection unit 19 outputs an overvoltage detection signal 19*a* to the gate drive unit 18 and the control unit 17. Upon receiving the overvoltage detection signal 19*a*, the gate drive unit 18 stops turning on/off the switching elements 11 to 16. Further, upon receiving the overvoltage detection signal 19*a*, the control unit 17 recognizes the occurrence of overvoltage. For example, the overvoltage protection unit 19 may be configured with such a circuit that compares, using a comparator, a voltage value obtained from the DC voltage value Vdc through resistor-based voltage division, with a voltage corresponding to the prescribed overvoltage determination threshold value VTHOV.

When the absolute value of the phase current value iu, iv or iw exceeds an overcurrent determination threshold value ITHOC, the overcurrent protection unit 20 outputs an overcurrent detection signal 20*a* to the gate drive unit 18 and the control unit 17. Upon receiving the overcurrent detection signal 20*a*, the gate drive unit 18 stops turning on/off the switching elements 11 to 16. Further, upon receiving the overcurrent detection signal 20*a*, the control unit 17 recognizes the occurrence of overcurrent.

For example, the overcurrent protection unit 20 may be configured with such a circuit that compares, using a comparator, an output voltage of a Hall-type current detection circuit with a voltage corresponding to the overcurrent determination threshold value ITHOC. Adjustment of the overcurrent determination threshold value ITHOC for the overcurrent protection unit 20 may be achieved by a method in which a voltage-dividing resistance for dividing the reference voltage of the circuit is changed using a transistor. Adjustment of the overcurrent determination threshold value ITHOC for the overcurrent protection unit 20 may be achieved in such a manner that the corresponding voltage to be compared with is generated using a D-A converter (Digital-Analog converter) on the basis of an overcurrent threshold signal 17*c* received as a H/L (High/Low) signal, an analog voltage signal or a digital signal indicative of a voltage value.

When the overvoltage protection unit 19 and the overcurrent protection unit 20 are configured as described above, it is possible to take action within a time that is shorter than in the case where overvoltage/overcurrent is detected and then a control instruction is issued by the control unit 17 that is a software-executing arithmetic device. This is because over-voltage/overcurrent is detected using an analog circuit or a digital circuit in the overvoltage protection unit 19 and the overcurrent protection unit 20, so that it is possible to promptly stop turning on/off the switching elements 11 to 16.

<Hardware Configuration of Control Device>

Figure 2:
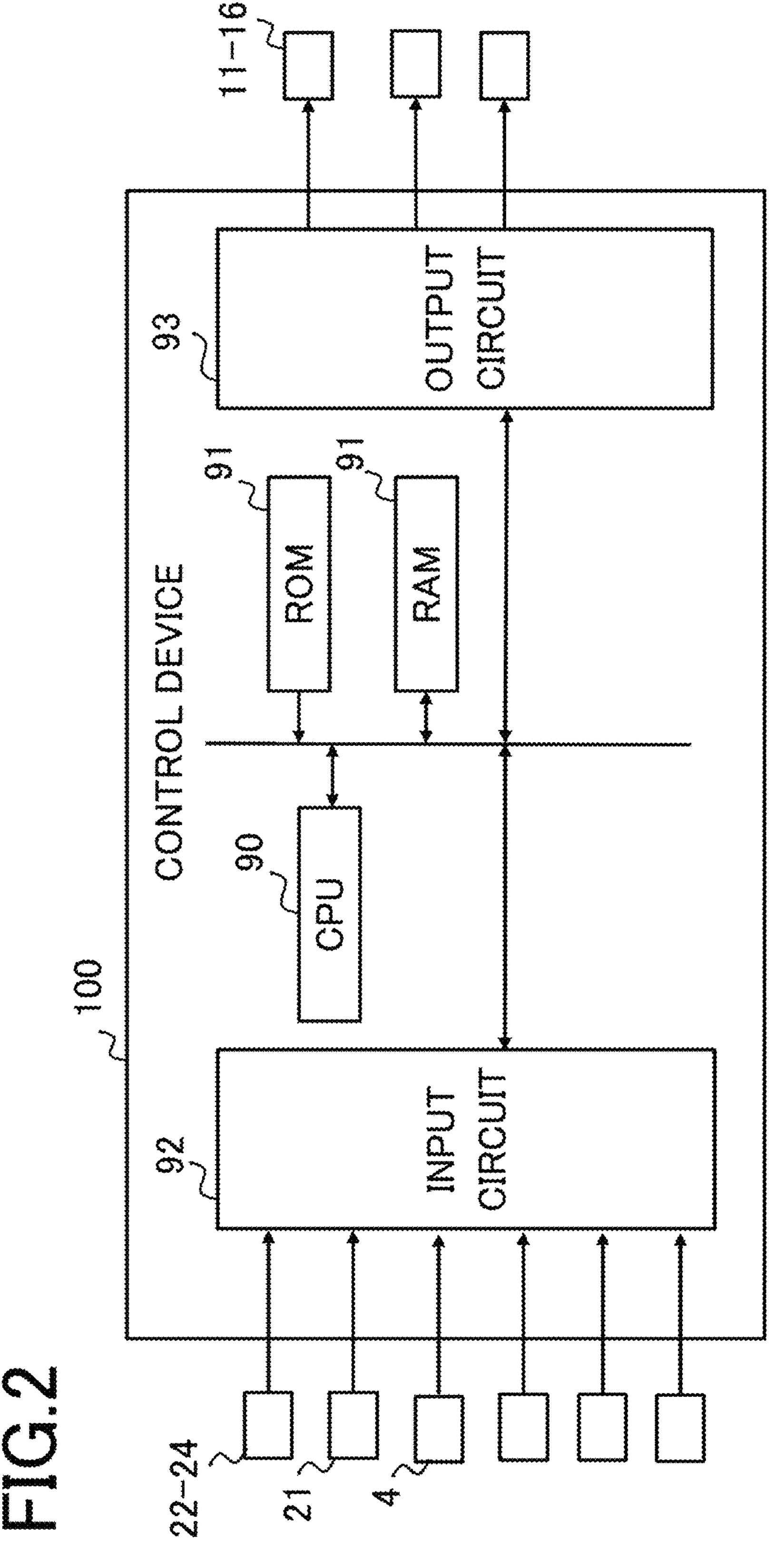
FIG. 2 is a first hardware configuration diagram of a control device of the electric-power conversion apparatus according to Embodiment 1.

FIG. 2 is a hardware configuration diagram of the control device 100 in the electric-power conversion apparatus 1 according to Embodiment 1. In this Embodiment, the respective functions of the control device 100 are implemented by a processing circuit included in the control device 100. Specifically, as shown in FIG. 2, the control device 100 includes as the processing circuit: an arithmetic processing device 90 (computer) such as a CPU (Central Processing Unit) or the like; storage devices 91 that perform data transactions with the arithmetic processing device 90; an input circuit 92 that inputs external signals to the arithmetic processing device 90; an output circuit 93 that externally outputs signals from the arithmetic processing device 90; and the like. The control unit 17 shown in FIG. 1 may include the arithmetic processing device 90.

As the arithmetic processing device 90, there may be included an ASIC (Application Specific Integrated Circuit), an IC (Integrated Circuit), a DSP (Digital Signal Processor), an FPGA (Field Programmable Gate Array), any one of a variety of logic circuits, any one of a variety of signal processing circuits, or the like. Further, multiple arithmetic processing devices 90 of the same type or different types may be included so that the respective parts of processing are executed in a shared manner. As the storage devices 91, there are included a RAM (Random Access Memory) that is configured to allow reading and writing of data by the arithmetic processing device 90, a ROM (Read Only Memory) that is configured to allow reading of data by the arithmetic processing device 90, a flash memory, and the like. The input circuit 92 is provided with: A-D convertors (Analog-Digital Converters) to which a variety of sensors and switches such as the voltage detector 21, the phase current detectors 22, 23, 24, the rotation angle sensor 4, etc. are connected, and which serve to input the output signals of the sensors and switches to the arithmetic processing device 90; and so on. The output circuit 93 is provided with: the gate drive unit 18 to which electric loads such as the switching elements 11 to 16 are connected, and which outputs control signals coming from the arithmetic processing device 90, after converting them, to these electric loads; and so on.

The respective functions that the control device 100 includes, are implemented in such a manner that the arithmetic processing device 90 executes software (programs) stored in the storage device 91 such as the ROM or the like, to thereby cooperate with the other hardware in the control device 100, such as the other storage device 91, the input circuit 92, the output circuit 93, etc. Note that the set data of threshold values, determinative values and the like to be used by the control device 100, is stored as a part of the software (programs), in the storage device 91 such as the ROM or the like. The functions of the configuration elements of the control device 100 will be described. Each of the functions of the control device 100 may be established by a software module; however, it may be established by a combination of software and hardware.

<Change of Switching Speed and Overcurrent Interruption (1)>

In order to reduce switching loss in an electric-power conversion apparatus, it is effective to increase the switching speed. However, if the switching speed is increased, a surge voltage at the time of energization or de-energization of the switching element increases, and further the driving noise increases. Thus, increasing the switching speed should be executed to the extent that the surge voltage does not exceed the breakdown voltage of the switching element.

A surge voltage that is expected at the time of stopping turning on/off the switching element can be calculated on the basis of the command value (current command value) given to the electric-power conversion apparatus, the battery voltage, etc. Thus, such control is conceivable in which the switching speed is increased only when the thus-calculated expected surge voltage is sufficiently lower than the breakdown voltage of the switching element. For example, let's assume a case where, when the current command value for the electric-power conversion apparatus or the detected phase current is not more than a predetermined switching-speed-change current value, the switching speed is set to high speed, and when it is more than the switching-speed-change current value, the switching speed is set to low speed.

However, in a state in which the electric-power conversion apparatus is operated at an increased switching speed, it is necessary to take into account a large surge voltage that may occur at the time of stopping turning on/off the switching element when the current or the voltage abruptly changes to exceed an overcurrent determination threshold value or an overvoltage determination threshold value. Thus, in consideration of the case where the switching speed is increased, the overcurrent determination threshold value and the overvoltage determination threshold value each have to be set to a small value. As a result, the maximum operating current and the maximum operating voltage in the case where the switching speed is not increased, is also limited by the overcurrent determination threshold value and the overvoltage determination threshold value, so that the operating range of the electric-power conversion apparatus is limited.

Figure 3:
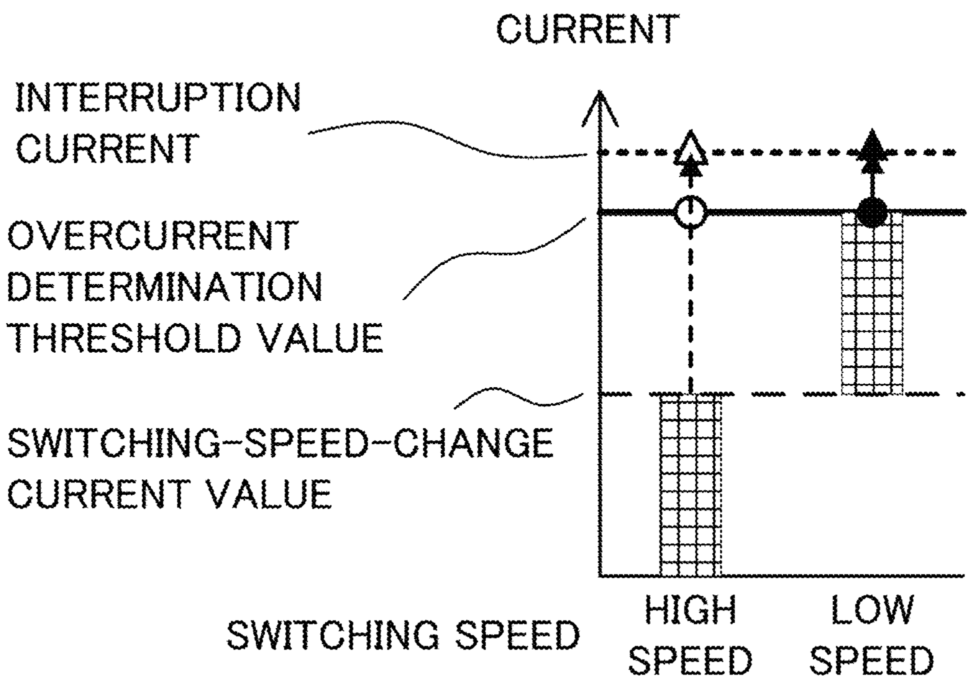
FIG. 3 is a first graph for illustrating how an electric-power conversion apparatus according to a comparative example will take action at the time of overcurrent detection.

FIG. 3 is a first graph for illustrating how an electric-power conversion apparatus according to a comparative example will take action at the time of overcurrent detection. Here, description will be made with reference to the configuration of the electric-power conversion apparatus 1 according to Embodiment 1. When the switching speed is low speed and the current value exceeds the overcurrent determination threshold value (as shown by a black circle (●) in FIG. 3), overcurrent is determined. On this occasion, because of a delay of the overcurrent protection unit 20, it is not possible to immediately interrupt the overcurrent, so that, actually, such an interruption current may occur that is higher than the overcurrent determination threshold value (as shown by a black triangle (▲) in FIG. 3).

It is necessary to prevent the surge voltage at the time the interruption is executed at that current, from exceeding the breakdown voltage value of the switching elements 11 to 16. To this end, it is necessary to determine such low-speed side switching speed so that the surge voltage that may occur due to the interruption current shown by a broken line in FIG. 3, does not exceed the breakdown voltage of the switching elements 11 to 16.

Let's consider a case where the switching speed is high speed. It is assumed that a trouble occurs when the switching speed is high speed, to thereby cause overcurrent. When the current command value for the electric-power conversion apparatus 1 or the detected phase current is more than the switching-speed-change current value, the switching speed will be changed to low speed. However, changing the switching speed will be performed in such a manner that the switching speed signal 17*b* is transferred from the control unit 17 to the gate drive unit 18.

On the basis of the externally-received command value, the control unit 17 controls power conversion operation. On this occasion, a delay time occurs until the control unit 17 outputs, after making calculation on the current command value or the detected phase current, the switching speed signal 17*b* on the basis of the processing result of that calculation.

In many cases, the switching frequency of the switching elements 11 to 16 of the electric-power conversion apparatus 1 mounted on a vehicle is at most about 10 kHz. For example, in a case where PWM (Pulse Width Modulation) control is executed at a switching frequency of 10 kHz, the generation of a current command, the sampling of sensor information such as a current, a voltage, a temperature, an angular rate, etc. and the calculation of a PWM input by using the sensor information, are performed every period of 100 μs. For changing the switching speed on the basis of the current command value for the electric-power conversion apparatus 1 or the detected phase current, a delay of about 100 μs will occur. Thus, since the currently-set switching speed is based on the parameters at the time 100 μs before, when the parameter represented by a current command value, a phase current or a voltage is varying, a case may arise where switching is not carried out at a switching speed adequate to the parameter at that time.

When electric-power conversion is executed at a switching speed that is high speed in FIG. 3, if an abnormality occurs and thus the phase current increases abruptly, the occurrence of overcurrent is determined at the time the phase current exceeds the overcurrent determination threshold value (see, a white circle (○) in FIG. 3), so that the overcurrent detection signal 20*a* is outputted by the overcurrent protection unit 20 to the gate drive unit 18. Then, upon receiving the overcurrent detection signal 20*a*, the gate drive unit 18 stops turning on/off the switching elements 11 to 16.

On this occasion, because of a delay of the overcurrent protection unit 20, it is not possible to immediately interrupt the overcurrent, so that, actually, such an interruption current may occur that is higher than the overcurrent determination threshold value (see, a white triangle (A) in FIG. 3). Since the current increases before the switching speed of the switching element is changed from being set high to being set low, interruption will be executed at the interruption current shown by the broken line while the switching speed remains set high. Since the surge voltage increases as the switching speed becomes higher, according to the setting shown in FIG. 3, a risk may arise that, because of the interruption current having increased at the time of abnormality or the like, the surge voltage exceeds the breakdown voltage of the switching element to cause its failure.

<Change of Switching Speed and Overcurrent Interruption (2)>

Figure 4:
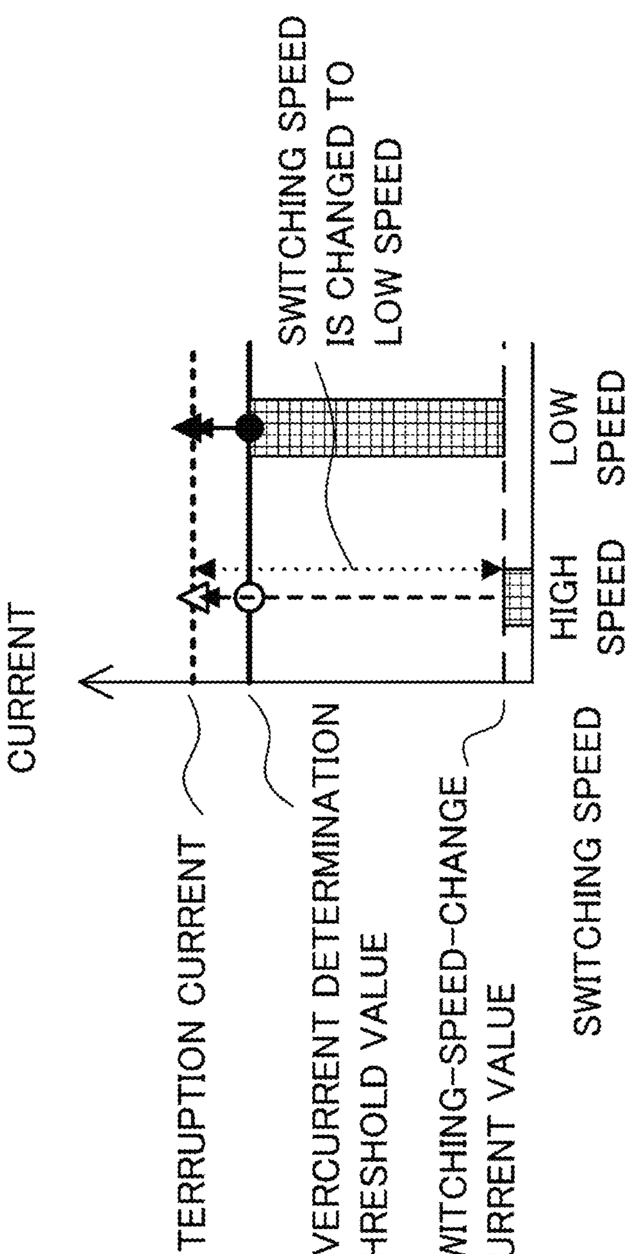
FIG. 4 is a second graph for illustrating how an electric-power conversion apparatus according to a comparative example will take action at the time of overcurrent detection.

FIG. 4 is a second graph for illustrating how an electric-power conversion apparatus according to a comparative example will take action at the time of overcurrent detection. In order to deal with and to solve the problem according to FIG. 3, the switching-speed-change current value is set to a small value as shown in FIG. 4. If it is so set, a time period in which a detected phase current increases from the switching-speed-change current value to reach the interruption current, is enlarged. Thus, the switching speed of the switching element would be changed to low speed in the thus-enlarged period.

Accordingly, the switching speed has been changed from high speed to low speed at the time the abnormal-time current reaches the interruption current (see, a white triangle (Δ) in FIG. 4). Thus, the surge voltage will stay in the range not exceeding the breakdown voltage of the switching element.

When the setting as shown in FIG. 4 is applied, another problem arises in that a current range in which the switching speed can be set to high speed is narrowed. Namely, the operating range in which the switching speed can be set to high speed and thus the switching loss can be reduced, is restricted. Specifically, for electric vehicles, it is expected to reduce the switching loss in a region in which the load of the electric rotating machine is small and thus the phase current is in the middle range or less, as exemplified by a state during cruising of the vehicle, except for a region in which the load of the electric rotating machine is large and thus the phase current is large, as exemplified by a state at the time of starting or accelerating the vehicle. However, when the switching-speed-change current value is set to a small value, a region in which the switching loss can be reduced will be narrowed, so that the loss—that is directly linked to the fuel consumption and electric-power consumption of the vehicle—cannot be reduced sufficiently.

Meanwhile, in the control unit 17, a timing of calculating the driving timing, the driving time and the switching speed of the switching elements 11 to 16 is determined to be every period of 100 μs, for example. Thus, if the current increases in a shorter time at the time of abnormality, it is conceivable that the switching speed is not changed to low speed in time, and thus, when the switching speed is high speed, the surge voltage at the time of interruption exceeds the breakdown voltage and thus overcurrent protection cannot be established.

<Simultaneous Change of Switching Speed and Overcurrent Determination Threshold Value>

Figure 5:
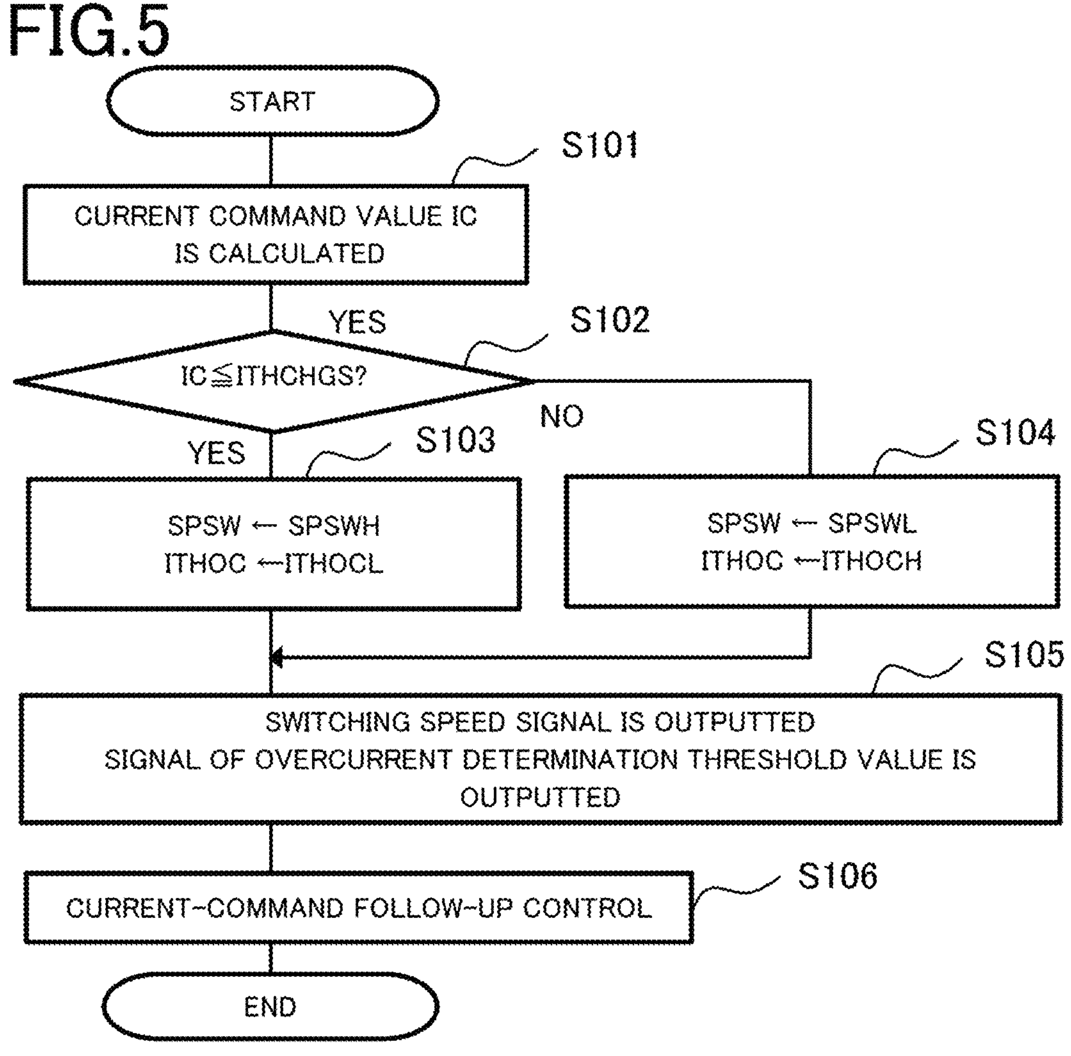
FIG. 5 is a flowchart showing processing of changing a switching speed by the control device of the electric-power conversion apparatus according to Embodiment 1.

FIG. 5 is a flowchart showing processing of changing the switching speed by the control device 100 of the electric-power conversion apparatus 1 according to Embodiment 1. Description will be made on processing of simultaneously changing the switching speed and the overcurrent determination threshold value, as a feature according to Embodiment 1 in this disclosure.

The processing shown in FIG. 5 is executed by the arithmetic processing device 90 in the control device 100. The processing of FIG. 5 may be executed every fixed period of time (for example, every 100 μs). Instead of being executed every fixed period of time, the processing may be executed at every occurrence of an event, such as, at every detection of specified input information, at every communication established, or the like.

Upon starting the processing, in Step S101, the control unit 17 receives command values of a torque command, a rotation speed command and the like, from the outside of the electric-power conversion apparatus 1, to thereby calculate a current command value IC. Instead, the control unit may directly receive the current command value IC from the outside. Examples of the current command value include a d-axis current command value and a q-axis current command value. The current command value calculated here is used for determining on/off timings of the switching elements driven by PWM.

In Step S102, in order to determine the switching speed, the current command value IC is compared with a switching-speed-change current value ITHCHGS. Since the current command value IC is used as a value to be compared with the switching-speed-change current value ITHCHGS, the switching speed can be determined stably.

At this time, instead of the current command value IC, the phase current detected by each of the phase current detectors

22, 23, 24 may be compared with the switching-speed-change current value ITHCHGS. It should be noted that, due to current feedback, the phase current will slightly fluctuate at around the current command value IC. In the case of using the phase current, an average value of phase currents in a fixed period may be calculated and used. Further, at the time of comparison with the switching-speed-change current value ITHCHGS, a hysteresis may be provided so that the switching speed is determined stably.

The current command value IC may be a current command effective value calculated from the d-axis current command value and the q-axis current command value. When the current command value IC is not more than the switching-speed-change current value ITHCHGS (judgement is YES), the flow moves to Step S103. When the current command value IC is more than the switching-speed-change current value ITHCHGS (judgement is NO), the flow moves to Step S104.

In Step S103, as the switching speed (SPSW), a switching speed H (high-speed side switching speed) SPSWH is set, and as the overcurrent determination threshold value ITHOC, an overcurrent determination threshold value L (lower overcurrent determination threshold value) ITHOCL is set. Then, the flow moves to Step S105.

In Step S104, as the switching speed SPSW, a switching speed L (low-speed side switching speed) SPSWL is set, and as the overcurrent determination threshold value ITHOC, an overcurrent determination threshold value H (upper overcurrent determination threshold value) ITHOCH is set. Then, the flow moves to Step S105.

In Step S105, the control unit 17 outputs the thus-set switching speed SPSW, as the switching speed signal 17*b*, to the gate drive unit 18. Further, the control unit 17 outputs the thus-set overcurrent determination threshold value ITHOC, as the overcurrent threshold signal 17*c*, to the gate drive unit 18.

In Step S106, on the basis of calculation for follow-up control toward the current command value IC, the control unit 17 outputs the control signal 17*a* to the gate drive unit 18, so that the gate drive unit executes current-command follow-up control by driving the switching elements 11 to 16. After Step S106, the processing is terminated.

<Relationship Between Switching Speed and Overcurrent Determination Threshold Value>

Figure 6:
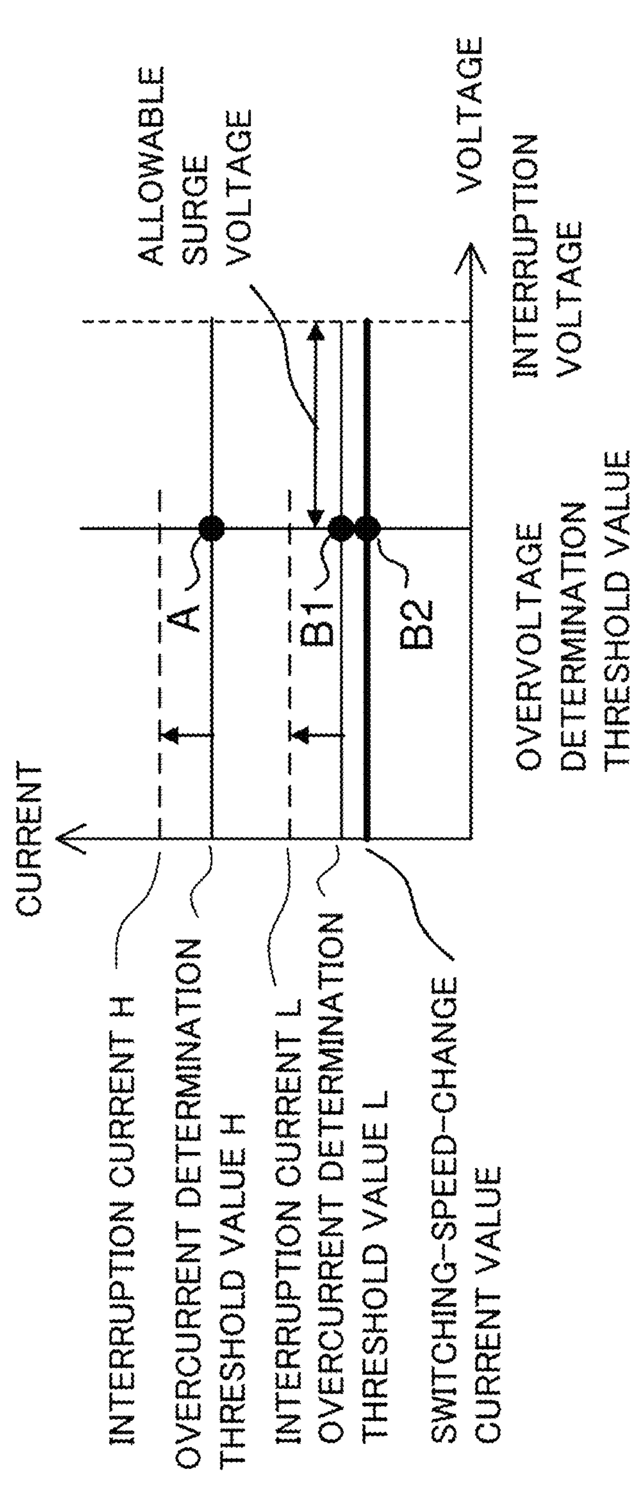
FIG. 6 is a graph for illustrating how to set an overcurrent determination threshold value in the electric-power conversion apparatus according to Embodiment 1.

FIG. 6 is a graph for illustrating how to set the overcurrent determination threshold value in the electric-power conversion apparatus 1 according to Embodiment 1. Setting methods of the switching speed SPSW and the overcurrent determination threshold value ITHOC will be described.

As a premise, a surge voltage occurs at the time of switching an IGBT; however, because of a parasitic inductance in the circuit and a recovery characteristic of a diode connected in reverse-parallel to the IGBT, the surge voltage tends to become higher as the current flowing at the time of switching becomes larger.

Meanwhile, by adjusting the gate resistance of the IGBT, it is possible to adjust the current change rate di/dt of the current flowing through the IGBT, namely, the switching speed. As the switching speed becomes higher because of the reduction in the gate resistance of the IGBT, the surge voltage becomes higher. If the current and the voltage at the time of switching remain unchanged, the switching loss becomes lower as the switching speed becomes higher. The same tendency appears in the case of increasing the gate voltage of the IGBT to thereby make the switching speed higher.

The overcurrent determination threshold value H (ITHOCH) shown in FIG. 6 is set for the case where the switching speed SPSW is the switching speed L (low-speed side switching speed) SPSWL. It is set to a value so that, when the electric-power conversion apparatus 1 operates with the switching speed L and at the maximum rated current, overcurrent would not be detected. Namely, the overcurrent determination threshold value H (ITHOCH) is set to a value larger than the maximum rated current of the electric-power conversion apparatus 1. Further, the overvoltage determination threshold value VTHOV is set to a value larger than the largest one of voltages that are available under the normal operation.

It is further noted that, when the occurrence of overcurrent is detected at a point indicated by “A” in FIG. 6, because of the delay of the overcurrent protection unit 20, it is not possible to immediately interrupt the overcurrent, so that, actually, an interruption current H may occur that is higher than the overcurrent determination threshold value. It is necessary to determine the switching speed L (low-speed side switching speed) SPSWL so that the surge voltage (interruption voltage) that may occur when interruption is executed at that interruption current, does not exceed the breakdown voltage value of the switching element.

Next, description will be made on a setting in the case where the switching speed SPSW is the switching speed H (high-speed side switching speed) SPSWH. The switching-speed-change current value ITHCHGS at a point indicated by “B2” in FIG. 6 is determined. For example, on the basis of a current frequently emerging in the running mode of the electric vehicle for restricting its electric-power consumption, the switching-speed-change current value ITHCHGS is determined so that an operating condition expected to improve the switching efficiency gets under the point indicated by “B2”. This makes it possible to execute power conversion operation with the switching speed H (high-speed side switching speed) SPSWH, in an operation mode expected to improve the switching efficiency. For convenience’s sake, the voltage at the point indicated by “B2” in FIG. 6 is assumed to be the same as that at the point indicated by “A”.

The overcurrent determination threshold value L (ITHOCL) is determined according to a point indicated by “B1” in FIG. 6 that is never reached during normal power conversion operation with the switching speed H (high-speed side switching speed) SPSWH. Although the overcurrent determination threshold value L (ITHOCL) corresponding to the point indicated by “B1” in FIG. 6 is not reached during normal power conversion operation with the switching speed H (high-speed side switching speed) SPSWH, it is determined so that, at the time of abnormal operation, overcurrent determination is promptly executed to thereby prevent the surge voltage at the time of interruption from exceeding the breakdown voltage value of the switching element.

When overcurrent occurs at the time of abnormal operation, the switching speed SPSW should be changed to the switching speed L (low-speed side switching speed) SPSWL, fundamentally at the time at which the current command value IC or the detected phase current gets larger than the switching-speed-change current value ITHCHGS. However, due to the timing of PWM calculation, there are cases where the change of the switching speed SPSW is delayed. In these cases, with the switching speed H (high-speed side switching speed) SPSWH remaining unchanged, the detected phase current will become larger than the overcurrent determination threshold value L and thus overcurrent will be determined.

Since overcurrent is determined at the point indicated by "B1" in FIG. 6, turning on/off the switching element is stopped, so that power conversion is suspended. On this occasion, since electric-power conversion is suspended under the condition of the switching speed H (high-speed side switching speed) SPSWH, the surge voltage becomes higher. However, a phase current at the time of current interruption corresponds to the overcurrent determination threshold value L (ITHOCL) that is smaller than the overcurrent determination threshold value H (ITHOCH), so that, even if there is a delay until the current interruption is actually done, the current value will increase, at most, up to an interruption current L in FIG. 6. Thus, the surge voltage due to the interruption current L does not exceed the breakdown voltage value of the switching element.

At the points indicated by "A", "B1" and "B2", the voltages are the same while the current values satisfy the relationship represented by "A">"B1">"B2". The switching speed can be increased within a region in which the current value is smaller than that at the point indicated by "B2". This makes it possible to reduce the loss of the switching element in a current region that is assumed to be generally frequently used in the electric vehicle.

The switching-speed-change current value ITHCHGS is set to a value that is smaller than the overcurrent determination threshold value L (ITHOCL). Specifically, the switching-speed-change current value ITHCHGS is a value based on AC-current effective value and to be compared with the current command value IC (effective value). Thus, it is set so that a current value resulting from adding a fluctuation component due to control, to a peak current given by "switching-speed-change current value $\times\sqrt{2}$" and a current ripple, is lower than the overcurrent determination threshold value L (ITHOCL).

Accordingly, in the normal time, when the current command value IC (effective value) exceeds the switching-speed-change current value ITHCHGS, the switching speed SPSW is changed to the switching speed L (low-speed side switching speed) SPSWL, and simultaneously, the overcurrent determination threshold value ITHOC is changed from the overcurrent determination threshold value L (ITHOCL) to the overcurrent determination threshold value H (ITHOCH).

Therefore, it is possible to enlarge a region in which the apparatus can be operated without detection of the occurrence of overcurrent. Thus, setting the switching-speed-change current value ITHCHGS to a value smaller than the overcurrent determination threshold value L (ITHOCL), is useful to enlarge the operational region of the electric-power conversion apparatus 1.

FIG. 7 is a graph for illustrating how the electric-power conversion apparatus 1 according to Embodiment 1 will take action at the time of overcurrent detection. As compared with the case of FIG. 4 according to the comparative example, the switching-speed-change current value ITHCHGS may have a value that is larger to the extent as needed. It can be seen that this makes it possible to set the switching speed higher to thereby sufficiently ensure a region in which the vehicle can travel with increased switching efficiency. Further, even if an abnormality occurs and the phase current increases abruptly at the time the switching speed is being set to high speed, it is possible to promptly establish overcurrent determination because of the detection of the value corresponding to the overcurrent determination threshold value L (ITHOCL) (see, a white circle (○) in FIG. 7). Thus, it is possible to promptly stop turning on/off the switching element, so that, even if there is a delay until the current interruption is actually done, the phase current will increase, at most, up to an interruption current L (see, a white triangle (Δ) in FIG. 7). Therefore, according to this case, it is clear that it is possible to prevent a failure, a performance degradation or a shortened life of the switching element from occurring due to the surge voltage at the time of de-energization of the switching element.

As described above, by the electric-power conversion apparatus 1 according to Embodiment 1, even if there is a delay in setting the switching speed, it is possible to stop switching operations in response to an abrupt current increase at the time of abnormality, in a short delay time, by using overcurrent protection. Accordingly, it is unnecessary to set the switching-speed-change current value ITHCHGS to a small value by taking into account the delay about the switching speed. Further, it is possible to set a high switching speed while taking into account an abrupt current increase at the time of abnormality and a current dependency of the surge voltage, so that the loss can be reduced.

In addition, since the overcurrent determination threshold value L (ITHOCL) and the overcurrent determination threshold value H (ITHOCH) can be freely set, it is possible to modify/set these overcurrent determination threshold values adequately in accordance with the performance of the electric-power conversion apparatus 1, the performance of the electric rotating machine as a load, and the traveling characteristics of the electric vehicle. This can be met simply by software change (parameter change), so that an electric-power conversion apparatus 1 with high flexibility is achievable.

It is noted that, in the above Embodiment, the description has been made on a method in which the switching speed is adjusted by changing the gate resistance; however, this is not limitative and an effect similar to the above is achievable when the switching speed is adjusted by changing the gate drive voltage or the gate drive current. Reducing the gate resistance, increasing the gate drive voltage or increasing the gate drive current, makes it possible to increase the switching speed.

<Action Against Overvoltage/Overcurrent Without Intervention of Software>

Figure 8:
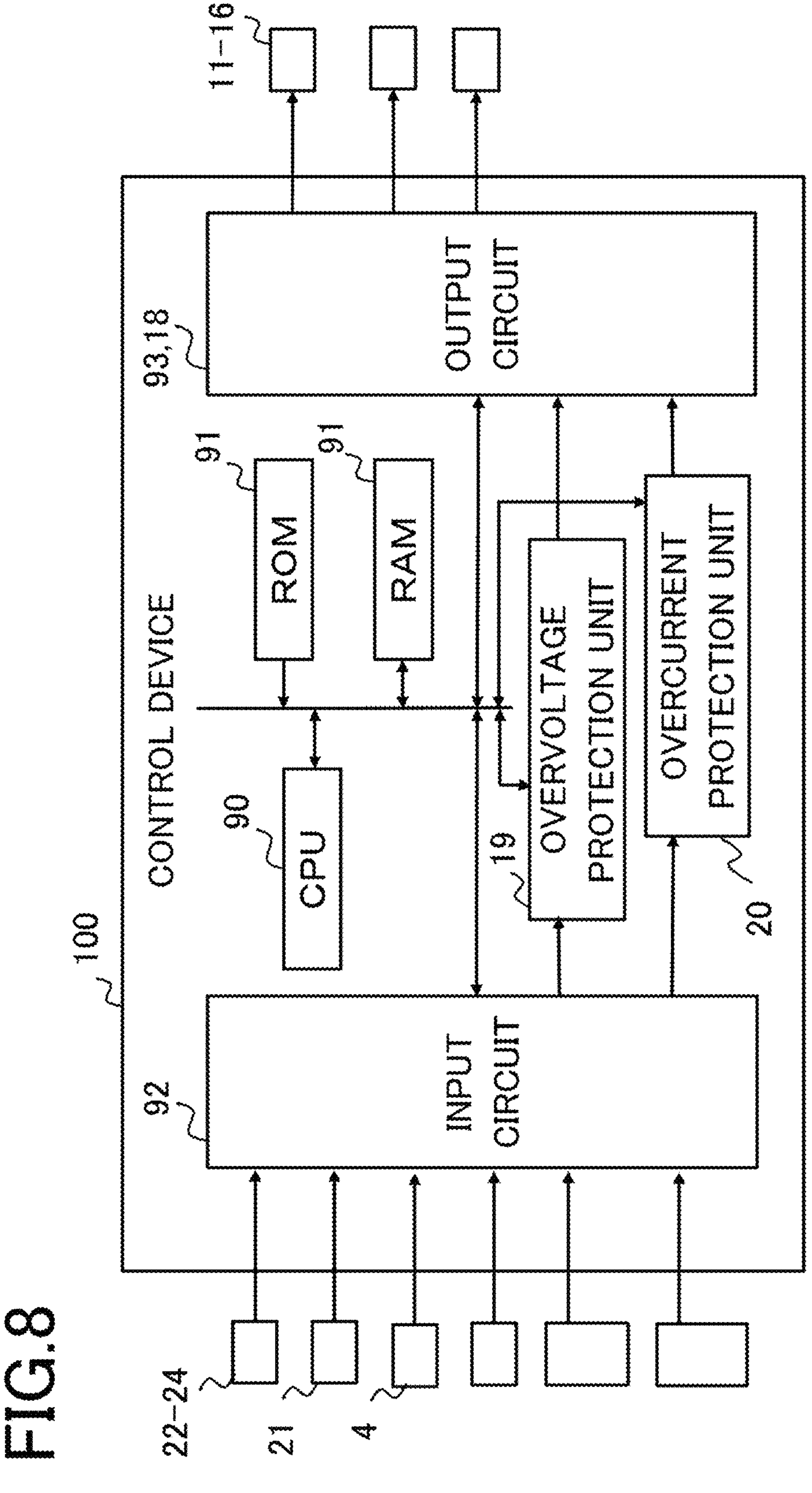
FIG. 8 is a second hardware configuration diagram of the control device in the electric-power conversion apparatus according to Embodiment 1.

FIG. 8 is a second hardware configuration diagram of the control device 100 in the electric-power conversion apparatus 1 according to Embodiment 1. If the overcurrent protection unit 20, the overvoltage protection unit 19 and the gate drive unit 18 are configured as an analog circuit and a digital circuit, such as a voltage-dividing resistor, a comparator, a logic circuit, etc., it is possible promptly to detect overvoltage/overcurrent and thus to take action.

As compared with the case where the overcurrent protection unit 20, the overvoltage protection unit 19 and the gate drive unit 18 are established as functions of an arithmetic device that executes software, it is possible to more promptly detect overvoltage/overcurrent to thereby stop turning on/off the switching elements 11 to 16 with the least delay. An exemplary hardware configuration of the control device 100 that employs such a configuration is shown in FIG. 8.

<Reduction of Delay Time by Interrupt Processing>

However, it is allowed that the output of the voltage detector 21 and the outputs of the phase current detectors 22, 23, 24 are subjected to A-D conversion every short period of time and, at every completion of the A-D conversion, input-capture interrupt processing is executed to thereby take action. The occurrence of overvoltage/overcurrent will be confirmed during the input-capture interrupt processing.

This makes it possible to take action against the occurrence of overvoltage/overcurrent with a shorter delay time, without waiting for the normal timing at every period of 100 μs at which a current command is generated and an PWM output is calculated. In this case, the overcurrent protection unit 20, the overvoltage protection unit 19 and the gate drive unit 18 can be established as functions of the arithmetic device that executes software.

For the electric-power conversion apparatus 1 mounted on the vehicle, it is necessary to detect overcurrent/overvoltage to thereby immediately suspend power conversion operation, when the DC power source 2 or the electric rotating machine 3 connected to that apparatus, or another electric component connected to the DC power source 2 operates abnormally or when the electric-power conversion apparatus 1 itself causes an erroneous operation temporarily due to noise or the like. It is required to stop turning on/off the switching element to thereby protect it so that the surge voltage at the time of switching does not exceed the breakdown voltage of the switching element. On the assumption that the current/voltage may vary abruptly, there are cases where the time from the detection of overcurrent/overvoltage to the suspension of power conversion is desired to be about several microseconds.

In such cases, it is required to take action in a time shorter than a delay that is normally set for the switching speed. Further, even when the input-capture interrupt processing is executed and the occurrence of overvoltage/overcurrent is confirmed every completion of the A-D conversion, such processing cannot be completed in several microseconds without difficulty.

In terms of dealing with these cases, it is advantageous to configure the overvoltage protection unit 19, the overcurrent protection unit 20 and the gate drive unit so that their functions for stopping the switching element in response to overcurrent/overvoltage are implemented without intervention of software processing. When they are configured so as to stop the switching elements in response to overcurrent/overvoltage by using operations of the analog circuit and the digital circuit, it is possible to achieve high-speed action against overcurrent/overvoltage.

2. Embodiment 2

<Configuration of Electric-Power Conversion Apparatus>

Figure 9:
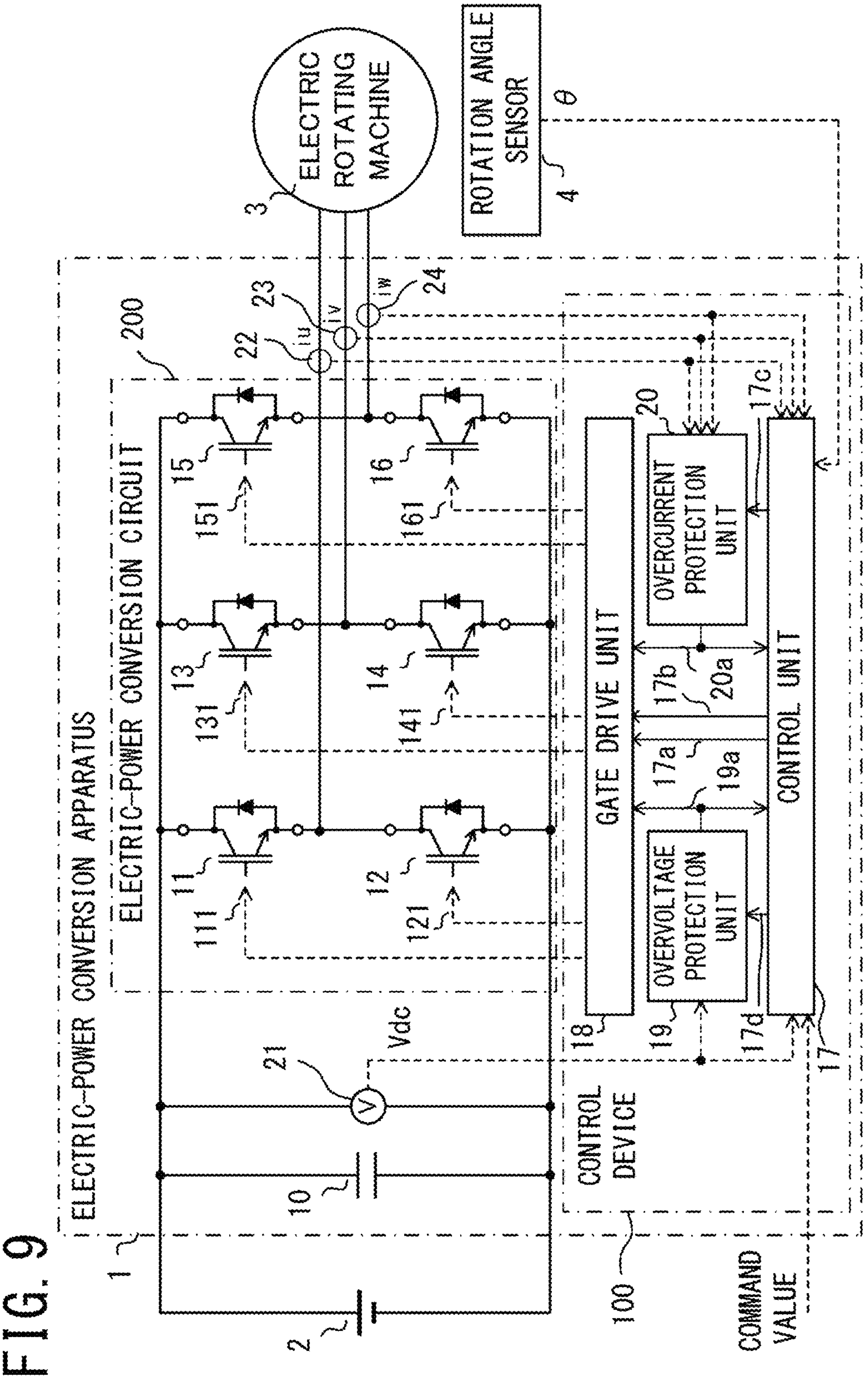
FIG. 9 is a configuration diagram of an electric-power conversion apparatus according to Embodiment 2.

FIG. 9 is a configuration diagram of an electric-power conversion apparatus 1 according to Embodiment 2. In Embodiment 1, the description has been made on the electric-power conversion apparatus 1 in which the switching speed SPSW and the overcurrent determination threshold value ITHOC are changed simultaneously. In Embodiment 2, description will be made on the electric-power conversion apparatus 1 in which the switching speed SPSW, the overcurrent determination threshold value ITHOC and the overvoltage determination threshold value VTHOV are changed simultaneously.

The electric-power conversion apparatus 1 in FIG. 9 differs from the electric-power conversion apparatus 1 in FIG. 1 according to Embodiment 1 only in that a function of changing the overvoltage determination threshold value VTHOV after receiving an overvoltage determination threshold value 17*d* transferred from the control unit 17, is added to the overvoltage protection unit 19. Adjustment of the overvoltage determination threshold value VTHOV for the overvoltage protection unit 19 may be achieved by a method in which a voltage-dividing resistance for dividing the reference voltage of the circuit is changed using a transistor. Adjustment of the overvoltage determination threshold value VTHOV for the overvoltage protection unit 19 may be achieved in such a manner that the voltage to be compared with is generated using a D-A converter (Digital-Analog converter) on the basis of the overvoltage threshold signal 17*d* received as a H/L (High/Low) signal, an analog voltage signal or a digital signal indicative of a voltage value. In the following, description will be made only on differences from Embodiment 1.

<Simultaneous Change of Switching Speed, Over-Current Determination Threshold Value and Overvoltage Determination Threshold Value>

FIG. 10 is a flowchart showing processing of changing the switching speed by the control device 100 of the electric-power conversion apparatus 1 according to Embodiment 2. Description will be made on processing of simultaneously changing the switching speed, the overcurrent determination threshold value and the overvoltage determination threshold value, as a feature according to Embodiment 2 in this disclosure.

The processing shown in FIG. 10 is executed by the arithmetic processing device 90 in the control device 100. The processing of FIG. 10 may be executed every fixed period of time (for example, every 100 μs). Instead of being executed every fixed period of time, the processing may be executed at every occurrence of an event, such as, at every detection of specified input information, at every communication established, or the like.

Upon starting the processing, in Step S201, the control unit 17 reads out the DC voltage value Vdc detected by the voltage detector 21. In Step 202, the control unit 17 receives command values of a torque command, a rotation speed command and the like, from the outside of the electric-power conversion apparatus 1, to thereby calculate a current command value IC. Instead, the control unit may directly receive the current command value IC from the outside. Examples of the current command value include a d-axis current command value and a q-axis current command value. The current command value calculated here is used for determining on/off timings of the switching elements driven by PWM.

In Step S203, in order to determine the switching speed, the current command value IC is compared with the switching-speed-change current value ITHCHGS. Since the current command value IC is used as a value to be compared with the switching-speed-change current value ITHCHGS, the switching speed can be determined stably.

At this time, instead of the current command value IC, the phase current detected by each of the phase current detectors 22, 23, 24 may be compared with the switching-speed-change current value ITHCHGS. It should be noted that, due to current feedback, the phase current will slightly fluctuate at around the current command value IC. In the case of using the phase current, an average value of phase currents in a fixed period may be calculated and used. Further, at the time of comparison with the switching-speed-change current value ITHCHGS, a hysteresis may be provided so that the switching speed is determined stably.

The current command value IC may be a current command effective value calculated from the d-axis current command value and the q-axis current command value. When the current command value IC is not more than the switching-speed-change current value ITHCHGS (judgement is YES), the flow moves to Step S204. When the current command value IC is more than the switchingspeed-change current value ITHCHGS (judgement is NO), the flow moves to Step S205.

In Step S204, whether or not the DC voltage value Vdc is not more than a switching-speed-change voltage value VTHCHGS is determined. If the DC voltage value Vdc is not more than the switching-speed-change voltage value VTHCHGS (judgement is YES), the flow moves to Step S206. If the DC voltage value Vdc is more than the switching-speed-change voltage value VTHCHGS (judgement is NO), the flow moves to Step S207.

In Step S206, as the switching speed SPSW, a switching speed H (high-speed side switching speed) SPSWH is set; as the overcurrent determination threshold value ITHOC, an overcurrent determination threshold value L (lower overcurrent determination threshold value) ITHOCL is set; and as the overvoltage determination threshold value VTHOV, an overvoltage determination threshold value L (lower overvoltage determination threshold value) VTHOVL is set. Then, the flow moves to Step S210.

In Step S207, as the switching speed SPSW, a switching speed M (medium switching speed) SPSWM is set; as the overcurrent determination threshold value ITHOC, the overcurrent determination threshold value L (lower overcurrent determination threshold value) ITHOCL is set; and as the overvoltage determination threshold value VTHOV, an overvoltage determination threshold value H (upper overvoltage determination threshold value) VTHOVH is set. Then, the flow moves to Step S210.

In Step S205, whether or not the DC voltage value Vdc is not more than the switching-speed-change voltage value VTHCHGS is determined. If the DC voltage value Vdc is not more than the switching-speed-change voltage value VTHCHGS (judgement is YES), the flow moves to Step S208. If the DC voltage value Vdc is more than the switching-speed-change voltage value VTHCHGS (judgement is NO), the flow moves to Step S209.

In Step S208, as the switching speed SPSW, the switching speed M (medium switching speed) SPSWM is set; as the overcurrent determination threshold value ITHOC, an overcurrent determination threshold value H (upper overcurrent determination threshold value) ITHOCH is set; and as the overvoltage determination threshold value VTHOV, the overvoltage determination threshold value L (lower overvoltage determination threshold value) VTHOVL is set. Then, the flow moves to Step S210.

In Step S209, as the switching speed SPSW, the switching speed L (low-speed side switching speed) SPSWL is set; as the overcurrent determination threshold value ITHOC, the overcurrent determination threshold value H (upper overcurrent determination threshold value) ITHOCH is set; and as the overvoltage determination threshold value VTHOV, the overvoltage determination threshold value H (upper overvoltage determination threshold value) VTHOVH is set. Then, the flow moves to Step S210.

In Step S210, the control unit 17 outputs the thus-set switching speed SPSW, as the switching speed signal 17*b*, to the gate drive unit 18. The control unit 17 outputs the thus-set overcurrent determination threshold value ITHOC, as the overcurrent threshold signal 17*c*, to the gate drive unit 18. Further, the control unit 17 outputs the thus-set overvoltage determination threshold value VTHOV, as the overvoltage threshold signal 17*d*, to the gate drive unit 18.

In Step S211, on the basis of calculation for follow-up control toward the current command value IC, the control unit 17 outputs the control signal 17*a* to the gate drive unit 18, so that the gate drive unit executes current-command follow-up control by driving the switching elements 11 to 16. After Step S211, the processing is terminated.

<Relationship between Switching Speed and Overcurrent Determination Threshold Value/Overvoltage Determination Threshold Value>

Figure 12:
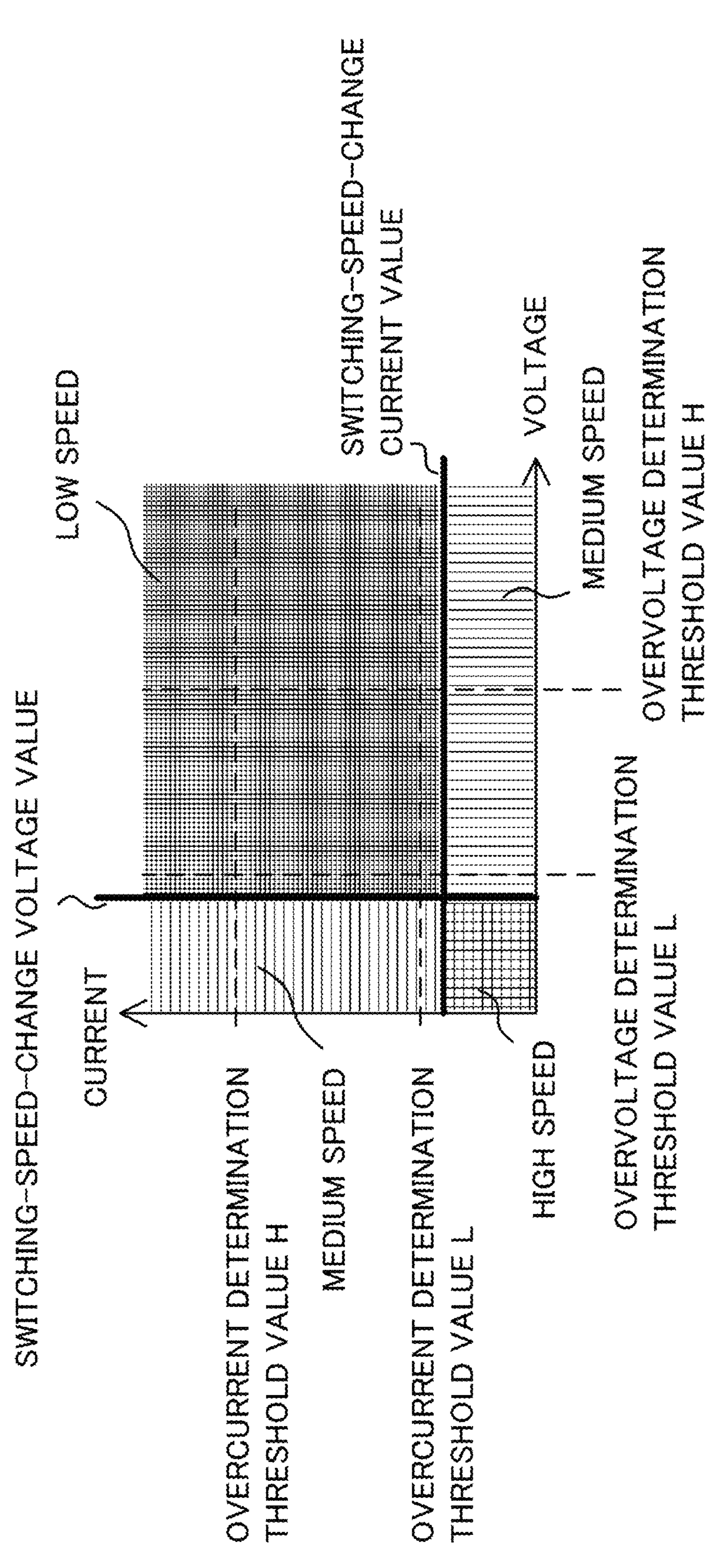
FIG. 12 is a graph for illustrating how to set a switching speed in the electric-power conversion apparatus according to Embodiment 2.

FIG. 11 is a graph for illustrating how to set the overcurrent determination threshold value and the overvoltage determination threshold value in the electric-power conversion apparatus 1 according to Embodiment 2. FIG. 12 is a graph for illustrating how to set the switching speed in the electric-power conversion apparatus according to Embodiment 2. FIG. 12 is a descriptive diagram focusing on switching between low speed, medium speed and high speed as switching speeds shown in FIG. 11. Setting methods of the switching speed SPSW, the overcurrent determination threshold value ITHOC and the overvoltage determination threshold value VTHOV will be described as follows.

In FIG. 11, surge-voltage satisfactory lines are lines which represent respective relationships between voltages and currents at which the surge voltage becomes equal to the breakdown voltage of the element, corresponding to the respective switching speeds defined as high speed, medium speed and low speed. On each line, a combination of a maximum voltage and a maximum current that are allowable for the switching element at the prescribed switching speed is shown and, although the line is illustrated as a straight line for convenience's sake, it is actually represented as a curved line.

When the current and the voltage are placed on the lower side of the surge-voltage satisfactory line, the surge voltage will not exceed the breakdown voltage of the switching element, thus ensuring an operational region thereof. In the figure, three surge-voltage satisfactory lines corresponding to the respective switching speeds of high speed, medium speed and low speed are shown. For example, when the switching speed is high speed, the surge voltage will increase, so that the allowable current is given on the lowest surge-voltage satisfactory line.

The overcurrent determination threshold value H (upper overcurrent determination threshold value) ITHOCH in FIG. 11 is set to a value so that, when the electric-power conversion apparatus 1 operates at the maximum rated current, overcurrent would not be detected. Further, the overvoltage determination threshold value H (upper overvoltage determination threshold value) VTHOVH is set to a value so that, when the electric-power conversion apparatus 1 operates at a maximum voltage of the DC power source 2 that is available at the normal time, overvoltage would not be detected.

The overcurrent determination threshold value H and the overvoltage determination threshold value H have to be set so that overcurrent protection and overvoltage protection is achievable at the time of abnormal operation. Specifically, the former is set so that, under the condition in which the switching speed is low speed, a surge voltage that may occur when tuning on/off the switching element is stopped after the detection of overcurrent, does not exceed the breakdown voltage value of the switching element. The latter is set so that, under the condition in which the switching speed is low speed, a surge voltage that may occur when tuning on/off the switching element is stopped after the detection of overvoltage, does not exceed the breakdown voltage value of the switching element.

The overcurrent determination threshold value H and the overvoltage determination threshold value H have to be set so that the surge voltage that may occur when the switching element is stopped with the interruption current H and the interruption voltage H, does not exceed the breakdown voltage value of the switching element. A point indicated by "E" in FIG. 11 is a maximum operating point for continuing operations when the switching speed is low speed. Conversely, a switching speed that satisfies the above condition may be set as the low-speed side switching speed.

On the basis of, for example, a current frequently emerging in the running mode of the battery electric vehicle for restricting its electric-power consumption, the overcurrent determination threshold value L (lower overcurrent determination threshold value) ITHOCL is set to a value so that the current value of that current does not exceed the overcurrent determination threshold value L. Further, the overvoltage determination threshold value L (lower overvoltage determination threshold value) VTHOVL is set to a value so that overcurrent would not be detected during normal traveling in the same running mode as the above. For example, when the DC power source 2 is a lithium-ion battery, since its voltage range is from 2.8 V to 4.2 V and its rated voltage is 3.7 V, per unit cell, the overvoltage determination threshold value L is set to a value so that, when the electric-power conversion apparatus operates at a rated voltage of the battery pack that is lower than its maximum voltage but is frequently used, overcurrent would not be detected.

In FIG. 11, the switching-speed-change current value ITHCHGS for changing the switching speed is set on the lower side of the overcurrent determination threshold value L. Specifically, since the switching-speed-change current value is a value based on AC-current effective value and to be compared with the current command value IC (effective value), it is set so that a current value resulting from adding a fluctuation component due to control, to a peak current given by "switching-speed-change current value $\times\sqrt{2}$" and a current ripple, is lower than the overcurrent determination threshold value L.

Further, the switching-speed-change voltage value VTHCHGS is set on the lower side of the over-voltage determination threshold value L. Specifically, since the switching-speed-change voltage value is a value to be compared with the detected DC voltage value Vdc, it is set so that a voltage value resulting from adding a voltage ripple and a detection error to the DC voltage value Vdc, is lower than the overvoltage determination threshold value L.

Accordingly, it becomes possible, when the current or the voltage increases under normal operating conditions, to continue operations while changing the switching speed, without causing overcurrent detection and overvoltage detection. Further, it becomes possible, when the current value or the voltage value increases abruptly due to the occurrence of abnormality, to promptly achieve overcurrent detection or over-voltage detection because of the value exceeding the overcurrent determination threshold value L or the overvoltage determination threshold value L, even if the change of the switching speed is delayed and the switching speed remains high. As the result, it becomes possible to promptly stop turning on/off the switching element in response to the overcurrent detection or the overvoltage detection. Since the switching speed is high speed, the surge voltage increases at the time the power conversion operation is suspended; however, when the overcurrent determination threshold value L and the overvoltage determination threshold value L are each set to an appropriately small value, the surge voltage never exceed the breakdown voltage value of the switching element. Thus, it is possible to provide an electric-power conversion apparatus which can prevent a failure, a performance degradation or a shortened life of the switching element while ensuring both efficient power conversion operation and wide-range power conversion operation.

In FIGS. 11 and 12, when the current command value IC is not more than the switching-speed-change current value ITHCHGS and the DC voltage value Vdc is not more than switching-speed-change voltage value VTHCHGS, the switching speed is set to high speed. When the current command value IC is more than the switching-speed-change current value ITHCHGS and the DC voltage value Vdc is more than switching-speed-change voltage value VTHCHGS, the switching speed is set to low speed. Further, in the other cases, the switching speed is set to medium speed.

The overcurrent determination threshold value L and the overvoltage determination threshold value L have to be set so that overcurrent protection and overvoltage protection is achievable at the time of abnormal operation. Specifically, the former is set so that, under the condition in which the switching speed is high speed, a surge voltage that may occur when tuning on/off the switching element is stopped after the detection of overcurrent, does not exceed the breakdown voltage value of the switching element. The latter is set so that, under the condition in which the switching speed is high speed, a surge voltage that may occur when tuning on/off the switching element is stopped after the detection of overvoltage, does not exceed the breakdown voltage value of the switching element.

The overcurrent determination threshold value L and the overvoltage determination threshold value L have to be set so that a surge voltage that may occur when the interruption current H and the interruption voltage H are applied, does not exceed the breakdown voltage value of the switching element. A point indicated by "D" in FIG. 11 is a maximum operating point for continuing operations when the switching speed is high speed. Conversely, a switching speed that satisfies the above condition may be set as the high-speed side switching speed.

Further, with respect to the combination of the overcurrent determination threshold value H and the overvoltage determination threshold value L, and the combination of the overcurrent determination threshold value L and the overvoltage determination threshold value H, cases where the switching speed is medium speed will be discussed. Similar to the above, these values have to be set so that overcurrent protection and overvoltage protection is achievable at the time of abnormal operation. Specifically, the former is set so that, under the condition in which the switching speed is medium speed, a surge voltage that may occur when tuning on/off the switching element is stopped after the detection of overcurrent, does not exceed the breakdown voltage value of the switching element. The latter is set so that, under the condition in which the switching speed is medium speed, a surge voltage that may occur when tuning on/off the switching element is stopped after the detection of overvoltage, does not exceed the breakdown voltage value of the switching element.

When the switching speed is medium speed, this speed may be determined so that a surge voltage that may occur when tuning on/off the switching element is stopped under the conditions in which the interruption current H and the interruption voltage L are applied in combination or the interruption current L and the interruption voltage H are applied in combination, does not exceed the breakdown voltage value of the switching element. A point indicated by "C" in FIG. 11 is a maximum operating point for continuing operations when the switching speed is medium speed and the current value is large. A point indicated by "F" in FIG. 11 is a maximum operating point for continuing operations when the switching speed is medium speed and the voltage value is large.

In the above manner, the switching speed H, the switching speed M, the switching speed L, the overcurrent determination threshold value H, the overcurrent determination threshold value L, the overvoltage determination threshold value H and the overvoltage determination threshold value L can be set adequately. As a result, it becomes possible to set the switching speed to high speed in a current/voltage range that is assumed to be frequently used in the electric vehicles, to thereby reduce the switching loss. Further, if one of the current and the voltage exceeds the switching-speed-change current value or the switching-speed-change voltage value, the switching speed is changed to medium speed, so that the operations can be ensured. Furthermore, with respect less-frequent operations in which the current and the voltage are maximized in the operating range, the switching speed is set to low speed, so that continuous operations of the electric-power conversion apparatus 1 is achievable.

Further, the overcurrent determination threshold value H (upper overcurrent determination threshold value) ITHOCH, the overcurrent determination threshold value L (lower overcurrent determination threshold value) ITHOCL, the overvoltage determination threshold value H (upper overvoltage determination threshold value) VTHOVH, the overvoltage determination threshold value L (lower overvoltage determination threshold value) VTHOVL, the switching speed H (high-speed side switching speed) SPSWH, the switching speed M (medium switching speed) SPSWM, the switching speed L (low-speed side switching speed) SPSWL, the switching-speed-change current value ITHCHGS and the switching-speed-change voltage value VTHCHGS, can be freely set. Thus, it is possible to modify/set these switching speeds and these overcurrent determination threshold values adequately in accordance with the performance of the electric-power conversion apparatus 1, the performance of the electric rotating machine as a load, and the traveling characteristics of the electric vehicle. This can be met simply by software change (parameter change), so that an electric-power conversion apparatus 1 with high flexibility is achievable.

In FIG. 12, the cases where the switching speed is to be changed between three types of high speed, medium speed and low speed, have been illustrated. However, as described below, the switching speed may be changed between four types of speeds.

When the current command value IC is not more than the switching-speed-change current value ITHCHGS and the DC voltage value Vdc is not more than the switching-speed-change voltage value VTHCHGS, the switching speed is set to a first speed. When the current command value IC is more than the switching-speed-change current value ITHCHGS and the DC voltage value Vdc is not more than the switching-speed-change voltage value VTHCHGS, the switching speed is set to a second speed. When the current command value IC is not more than the switching-speed-change current value ITHCHGS and the DC voltage value Vdc is more than the switching-speed-change voltage value VTHCHGS, the switching speed is set to a third speed. When the current command value IC is more than the switching-speed-change current value ITHCHGS and the DC voltage value Vdc is more than the switching-speed-change voltage value VTHCHGS, the switching speed is set to a fourth speed.

Further, these speeds may be set to have a relationship of "first speed">"second speed", "third speed">"fourth speed", and the second speed and the third speed may be set to different speeds. It is allowed to experimentally evaluate the influence of a delay due to change of the switching speed; the influence of increased current value due to current-interruption delay at the time of overcurrent detection; and the behaviors of the interruption surge voltage caused by these influences; and the like; to thereby set the respective switching speeds and the respective determination values for change, that are optimum in a range in which the surge voltage does not exceed the breakdown voltage value of the switching element. According to this setting method, it is possible to modify/set the switching speeds, the determination values for change and the overcurrent determination threshold values, more adequately in accordance with the performance of the electric-power conversion apparatus 1, the performance of the electric rotating machine as a load, and the traveling characteristics of the electric vehicle.

<Temperature Characteristics of Switching Element>

In Embodiments 1, 2, the description has been made on the cases where the switching speed and the overcurrent determination threshold value/the over-voltage determination threshold value are changed on the basis of the current and the voltage. In a further aspect, the switching speed and the overcurrent determination threshold value/the overvoltage determination threshold value may be changed on the basis of the temperature of the switching element in addition to the above.

According to an IGBT, a MOSFET or the like, as the temperature of such a switching element becomes lower, a threshold value for the gate voltage increases, so that the turn-off switching time becomes shorter. Due to this influence, the switching speed increases, so that the surge voltage becomes higher. Further, as the temperature becomes lower, the breakdown voltage of the element decreases, so that a surge-voltage allowable value decreases.

Meanwhile, as the temperature of the switching element becomes higher, the recovery characteristic of the diode connected in reverse-parallel to the IGBT or the body diode of the MOSFET deteriorates, so that the surge voltage at the time of turn-on becomes higher. As described above, it is assumed that, as the temperature becomes lower or higher, the surge voltage becomes higher. Further, as the temperature becomes lower, the breakdown voltage of the element decreases.

Thus, the switching speed or the overcurrent determination threshold value/the overvoltage determination threshold value may be adjusted on the basis of such temperature characteristics. If so adjusted, it becomes possible to calculate an adequate breakdown current value/breakdown voltage value of the switching element based on the temperature characteristics. This makes it possible to reduce the loss in the operating range that is wider than otherwise, while preventing deterioration of the switching element.

In cases where the surge voltage will become higher because of the temperature, the switching speed may be adjusted to decrease, while keeping unchanged the overcurrent determination threshold value/the over-voltage determination threshold value described in the foregoing embodiments. Further, the overcurrent determination threshold value/the overvoltage determination threshold value may be adjusted while keeping the switching speed unchanged. Further, it is allowed to take action against these cases by employing a method of adjusting both the switching speed and the over-current determination threshold value/the over-voltage determination threshold value. Meanwhile, the temperature of the switching element may be a temperature that is detected by a temperature detector directly from the switching element, and other than that, it may be a temperature that is detected by a temperature detector that detects a temperature in the power module and near the switching element.

In Embodiments 1, 2, the electric-power conversion apparatus 1 is exemplified by that which uses IGBTs formed of a silicon semiconductor. However, the electric-power conversion apparatus is not limited thereto. For example, a wide bandgap semiconductor such as a silicon carbide or gallium nitride-based material, or diamond, may instead be used. Such a wide bandgap semiconductor is expensive as compared with the silicon semiconductor; however, it plays a useful role since it is used with the intention of loss reduction and thus can promote reducing the loss more significantly.

In Embodiments 1, 2, the description has been made using a method in which the overvoltage determination threshold value of the overvoltage protection unit 19 and the overcurrent determination threshold value of the overcurrent protection unit 20 are adjusted. However, such a method may instead be employed in which a plurality of protection circuits is provided and the protection circuit corresponding to a low current-value or voltage-value range is enabled, to thereby suppress abrupt current/voltage increase at the time of abnormality.

In the foregoing, a method has been described in which, upon comparing the switching-speed-change current value with the current or comparing the switching-speed-change voltage value with the voltage, the switching speed and the overcurrent determination threshold value/the overvoltage determination threshold value are simultaneously changed. However, it is allowed to use a plurality of switching-speed-change threshold values for each of the current and the voltage. Instead, such a method may be employed in which the switching speed and the overcurrent determination threshold value/the overvoltage determination threshold value are constantly adjusted so that a surge voltage calculated on the basis of the current and the voltage and taking into account the behavior at the time of abnormality, does not exceed the breakdown voltage of the element.

Further, a method has been described in which the switching speed and the overcurrent determination threshold value/the overvoltage determination threshold value are adjusted on the basis of the current command value; however, this is not limitative, and they may be adjusted on the basis of, for example, an instantaneous value of the phase current. The description has been made on the cases where the electric-power conversion circuit 200 of the electric-power conversion apparatus 1 is an inverter. However, the electric-power conversion apparatus is not limited so, and even if the electric-power conversion circuit is a DC-DC converter, the technique according to this disclosure can be applied.

For example, even if it is a DC-DC converter in which a reactor is connected to the connection point between the upper and lower arms in the series circuit of the switching elements, and which is controlled upon detection of the reactor current and the voltage between both ends of the series circuit, an effect similar to the above will be achieved.

In this disclosure, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed here. For example, such cases shall be included where at least one configuration element is modified; where at least one configuration element is added or omitted; and furthermore, where at least one configuration element is extracted and combined with a configuration element of another embodiment.

Various embodiments disclosed above are summarized in the following appendices.

(Appendix 1)

An electric-power conversion apparatus comprising:

an electric-power conversion circuit which is provided with a positive-side switching element connected to a positive electrode of a DC power source, a negative-side switching element connected to a negative electrode of the DC power source, and an external connection point at which the positive-side switching element and the negative-side switching element are connected in series to each other and from which an AC output is taken out;

a voltage detector that detects a voltage between a positive side and a negative side of the electric-power conversion circuit;

a phase current detector that detects a phase current flowing between the external connection point of the electric-power conversion circuit and an output destination of the AC output; and a control device having: a controller that outputs a control signal to control the above switching elements, on a basis of an external command value, and that outputs a speed instruction signal to specify a switching speed of the switching elements; an overvoltage protector that outputs an overvoltage interruption signal when the voltage detected by the voltage detector is larger than a predetermined overvoltage determination threshold value; an overcurrent protector that outputs an overcurrent interruption signal when the phase current detected by the phase current detector is larger than a predetermined overcurrent determination threshold value; and a gate driver that turns on/off the switching elements on a basis of the control signal outputted by the controller, that changes a turn on/off speed of the switching elements on a basis of the speed instruction signal, and that stops turning on/off the switching elements on a basis of the overvoltage interruption signal outputted by the overvoltage protector and/or the overcurrent interruption signal outputted by the overcurrent protector;

wherein, when the control device changes the speed instruction signal, it simultaneously changes at least one of the overvoltage determination threshold value and the overcurrent determination threshold value.

(Appendix 2)

The electric-power conversion apparatus as set forth in Appendix 1, wherein the control device changes the speed instruction signal and the overcurrent determination threshold value on a basis of a current command value calculated from the external command value, or the phase current.

(Appendix 3)

The electric-power conversion apparatus as set forth in Appendix 2, wherein the control device changes the speed instruction signal so that the switching speed of the switching elements decreases as the current command value or the phase current becomes larger, and changes the overcurrent determination threshold value so that it increases as the current command value or the phase current becomes larger.

(Appendix 4)

The electric-power conversion apparatus as set forth in Appendix 2, wherein, when the current command value or the phase current becomes larger than a predetermined speed-change current value, the control device changes the speed instruction signal so that the switching speed of the switching elements decreases, and changes the overcurrent determination threshold value so that it increases.

(Appendix 5)

The electric-power conversion apparatus as set forth in Appendix 4, wherein, in the control device, the speed-change current value is always smaller than the overcurrent determination threshold value.

(Appendix 6)

The electric-power conversion apparatus as set forth in any one of Appendices 2 to 5, wherein the control device changes the speed instruction signal and the overcurrent determination threshold value on a basis of the current command value.

(Appendix 7)

The electric-power conversion apparatus as set forth in Appendix 1, wherein the control device changes the speed instruction signal and the overvoltage determination threshold value on a basis of the voltage detected by the voltage detector.

(Appendix 8)

The electric-power conversion apparatus as set forth in Appendix 7, wherein the control device changes the speed instruction signal so that the switching speed of the switching elements decreases as the voltage becomes larger, and changes the overvoltage determination threshold value so that it increases as the voltage becomes larger.

(Appendix 9)

The electric-power conversion apparatus as set forth in Appendix 7, wherein, when the voltage becomes larger than a predetermined speed-change voltage value, the control device changes the speed instruction signal so that the switching speed of the switching elements decreases, and changes the overvoltage determination threshold value so that it increases.

(Appendix 10)

The electric-power conversion apparatus as set forth in Appendix 9, wherein, in the control device, the speed-change voltage value is always smaller than the overvoltage determination threshold value.

(Appendix 11)

The electric-power conversion apparatus as set forth in Appendix 1, wherein, when the current command value or the phase current, is not more than a predetermined speed-change current value and the voltage is not more than a predetermined speed-change voltage value, the control device: outputs the speed instruction signal for setting the switching speed of the switching elements to a first speed; sets the overcurrent determination threshold value to a first overcurrent determination threshold value; and sets the overvoltage determination threshold value to a first overvoltage determination threshold value;

when the current command value or the phase current is more than the speed-change current value and the voltage is not more than the speed-change voltage value, the control device: outputs the speed instruction signal for setting the switching speed of the switching elements to a second speed that is lower than the first speed; sets the overcurrent determination threshold value to a second overcurrent determination threshold value that is larger than the first overcurrent determination threshold value; and sets the overvoltage determination threshold value to the first overvoltage determination threshold value;

when the current command value or the phase current is not more than the speed-change current value and the voltage is more than the speed-change voltage value, the control device: outputs the speed instruction signal for setting the switching speed of the switching elements to a third speed that is lower than the first speed; sets the overcurrent determination threshold value to the first overcurrent determination threshold value; and sets the overvoltage determination threshold value to a second overvoltage determination threshold value that is larger than the first overvoltage determination threshold value; and when the current command value or the phase current is more than the speed-change current value and the voltage is more than the speed-change voltage value, the control device: outputs the speed instruction signal for setting the switching speed of the switching elements to a fourth speed that is lower than the second speed and the third speed; sets the overcurrent determination threshold value to the second overcurrent determination threshold value; and sets the overvoltage determination threshold value to the second overvoltage determination threshold value.

(Appendix 12)

The electric-power conversion apparatus as set forth in any one of Appendices 1 to 11, further comprising a temperature sensor that detects a temperature of the switching elements, wherein the control device simultaneously changes the speed instruction signal and at least one of the overvoltage determination threshold value and the overcurrent determination threshold value, additionally on a basis of the temperature of the switching elements.

(Appendix 13)

The electric-power conversion apparatus as set forth in any one of Appendices 1 to 12, wherein, in the control device, the speed instruction signal and at least one of the overvoltage determination threshold value and the overcurrent determination threshold value are set so that a surge voltage that may occur when turning on/off the switching elements is stopped by the gate driver on the basis of the overvoltage interruption signal or the overcurrent interruption signal, is not more than a breakdown voltage of the switching elements.

(Appendix 14)

The electric-power conversion apparatus as set forth in any one of Appendices 1 to 13, wherein the control device changes the turn on/off speed of the switching elements by changing at least one of a gate drive voltage, a gate drive current and a gate drive resistance in the gate driver.

(Appendix 15)

The electric-power conversion apparatus as set forth in any one of claims 1 to 14, wherein, with respect to the control device, processing by the overvoltage protector to output the overvoltage interruption signal when the voltage is larger than the overcurrent determination threshold value; processing by the overcurrent protector to output the overcurrent interruption signal when the phase current is larger than the overcurrent determination threshold value; and processing by the gate driver to stop turning on/off the switching elements on the basis of the overvoltage interruption signal or the overcurrent interruption signal; are executed without intervention of software processing.

(Appendix 16)

The electric-power conversion apparatus as set forth in any one of Appendices 1 to 15, wherein the switching elements use a wide bandgap semiconductor.

What is claimed is:

1. An electric-power conversion apparatus comprising:

an electric-power conversion circuit which is provided with a positive-side switching element connected to a positive electrode of a DC power source, a negative-side switching element connected to a negative electrode of the DC power source, and an external connection point at which the positive-side switching element and the negative-side switching element are connected in series to each other and from which an AC output is taken out;

a voltage detector that detects a voltage between a positive side and a negative side of the electric-power conversion circuit;

a phase current detector that detects a phase current flowing between the external connection point of the electric-power conversion circuit and an output destination of the AC output; and a control device having: a controller that outputs a control signal to control the above switching elements, on a basis of an external command value, and that outputs a speed instruction signal to specify a switching speed of the switching elements; an overvoltage protector that outputs an overvoltage interruption signal when the voltage detected by the voltage detector is larger than a predetermined overvoltage determination threshold value; an overcurrent protector that outputs an overcurrent interruption signal when the phase current detected by the phase current detector is larger than a predetermined overcurrent determination threshold value; and a gate driver that turns on/off the switching elements on a basis of the control signal outputted by the controller, that changes a turn on/off speed of the switching elements on a basis of the speed instruction signal, and that stops turning on/off the switching elements on a basis of the overvoltage interruption signal outputted by the overvoltage protector and/or the overcurrent interruption signal outputted by the overcurrent protector;

wherein, when the control device changes the speed instruction signal, it simultaneously changes at least one of the overvoltage determination threshold value and the overcurrent determination threshold value.

2. The electric-power conversion apparatus as set forth in claim 1, wherein the control device changes the speed instruction signal and the overcurrent determination threshold value on a basis of a current command value calculated from the external command value, or the phase current.

3. The electric-power conversion apparatus as set forth in claim 2, wherein the control device changes the speed instruction signal so that the switching speed of the switching elements decreases as the current command value or the phase current becomes larger, and changes the overcurrent determination threshold value so that it increases as the current command value or the phase current becomes larger.

4. The electric-power conversion apparatus as set forth in claim 2, wherein, when the current command value or the phase current becomes larger than a predetermined speed-change current value, the control device changes the speed instruction signal so that the switching speed of the switching elements decreases, and changes the overcurrent determination threshold value so that it increases.

5. The electric-power conversion apparatus as set forth in claim 4, wherein, in the control device, the speed-change current value is always smaller than the overcurrent determination threshold value.

6. The electric-power conversion apparatus as set forth in claim 2, wherein the control device changes the speed instruction signal and the overcurrent determination threshold value on a basis of the current command value.

7. The electric-power conversion apparatus as set forth in claim 1, wherein the control device changes the speed instruction signal and the overvoltage determination threshold value on a basis of the voltage detected by the voltage detector.

8. The electric-power conversion apparatus as set forth in claim 7, wherein the control device changes the speed instruction signal so that the switching speed of the switching elements decreases as the voltage becomes larger, and changes the overvoltage determination threshold value so that it increases as the voltage becomes larger.

9. The electric-power conversion apparatus as set forth in claim 7, wherein, when the voltage becomes larger than a predetermined speed-change voltage value, the control device changes the speed instruction signal so that the switching speed of the switching elements decreases, and changes the overvoltage determination threshold value so that it increases.

10. The electric-power conversion apparatus as set forth in claim 9, wherein, in the control device, the speed-change voltage value is always smaller than the overvoltage determination threshold value.

11. The electric-power conversion apparatus as set forth in claim 1, wherein, when a current command value calculated from the external command signal, or the phase current, is not more than a predetermined speed-change current value and the voltage is not more than a predetermined speed-change voltage value, the control device: outputs the speed instruction signal for setting the switching speed of the switching elements to a first speed; sets the overcurrent determination threshold value to a first overcurrent determination threshold value; and sets the overvoltage determination threshold value to a first overvoltage determination threshold value;

when the current command value or the phase current is more than the speed-change current value and the voltage is not more than the speed-change voltage value, the control device: outputs the speed instruction signal for setting the switching speed of the switching elements to a second speed that is lower than the first speed; sets the overcurrent determination threshold value to a second overcurrent determination threshold value that is larger than the first overcurrent determination threshold value; and sets the overvoltage determination threshold value to the first overvoltage determination threshold value;

when the current command value or the phase current is not more than the speed-change current value and the voltage is more than the speed-change voltage value, the control device: outputs the speed instruction signal for setting the switching speed of the switching elements to a third speed that is lower than the first speed; sets the overcurrent determination threshold value to the first overcurrent determination threshold value; and sets the overvoltage determination threshold value to a second overvoltage determination threshold value that is larger than the first overvoltage determination threshold value; and when the current command value or the phase current is more than the speed-change current value and the voltage is more than the speed-change voltage value, the control device: outputs the speed instruction signal for setting the switching speed of the switching elements to a fourth speed that is lower than the second speed and the third speed; sets the overcurrent determination threshold value to the second overcurrent determination threshold value; and sets the overvoltage determination threshold value to the second overvoltage determination threshold value.

12. The electric-power conversion apparatus as set forth in claim 1, further comprising a temperature sensor that detects a temperature of the switching elements, wherein the control device simultaneously changes the speed instruction signal and at least one of the overvoltage determination threshold value and the overcurrent determination threshold value, additionally on a basis of the temperature of the switching elements.

13. The electric-power conversion apparatus as set forth in claim 1, wherein, in the control device, the speed instruction signal and at least one of the overvoltage determination threshold value and the overcurrent determination threshold value are set so that a surge voltage that may occur when turning on/off the switching elements is stopped by the gate driver on the basis of the overvoltage interruption signal or the overcurrent interruption signal, is not more than a breakdown voltage of the switching elements.

14. The electric-power conversion apparatus as set forth in claim 1, wherein the control device changes the turn on/off speed of the switching elements by changing at least one of a gate drive voltage, a gate drive current and a gate drive resistance in the gate driver.

15. The electric-power conversion apparatus as set forth in claim 1, wherein, with respect to the control device, processing by the overvoltage protector to output the overvoltage interruption signal when the voltage is larger than the overcurrent determination threshold value; processing by the overcurrent protector to output the overcurrent interruption signal when the phase current is larger than the overcurrent determination threshold value; and processing by the gate driver to stop turning on/off the switching elements on the basis of the overvoltage interruption signal or the overcurrent interruption signal; are executed without intervention of software processing.

16. The electric-power conversion apparatus as set forth in claim 1, wherein the switching elements use a wide bandgap semiconductor.

* * * * *